US011621824B2

(12) United States Patent
Srivastava

(10) Patent No.: US 11,621,824 B2
(45) Date of Patent: *Apr. 4, 2023

(54) BLOCKCHAIN TRANSACTION MANAGER

(71) Applicant: DLT Global, Inc., Toronto (CA)

(72) Inventor: Neeraj Srivastava, Toronto (CA)

(73) Assignee: DLT Global, Inc., Toronto (CA)

( * ) Notice: Subject to any disclaimer, the term of this patent is extended or adjusted under 35 U.S.C. 154(b) by 8 days.

This patent is subject to a terminal disclaimer.

(21) Appl. No.: 17/443,055

(22) Filed: Jul. 20, 2021

(65) Prior Publication Data

US 2021/0359838 A1 Nov. 18, 2021

Related U.S. Application Data

(63) Continuation of application No. 17/115,701, filed on Dec. 8, 2020, now Pat. No. 11,095,431.
(Continued)

(51) Int. Cl.
*H04L 9/06* (2006.01)
*H04L 9/32* (2006.01)
(Continued)

(52) U.S. Cl.
CPC .......... *H04L 9/0618* (2013.01); *H04L 9/3247* (2013.01); *H04L 9/3263* (2013.01);
(Continued)

(58) Field of Classification Search
CPC ................ H04L 9/0618; H04L 9/3247; H04L 9/3263; H04L 9/3297; H04L 9/50; H04L 9/3239;
(Continued)

(56) References Cited

U.S. PATENT DOCUMENTS 10,608,829 B1 3/2020 Yoshihama et al.
10,652,239 B2 5/2020 Jentzsch et al.
(Continued)

OTHER PUBLICATIONS

Consensys, "Ethereum, Gas, Fuel, & Fees—ConsenSys Media," Apr. 6, 2019, XP055863763, URL: https://web.archive.org/web/20190406214353/https://media.consensys.net/ethereum-gas-fuel-and-fees-3333e17fe1de?gi=fda25a2daacc, last retrieved on Nov. 19, 2021, 8 pages.
European Patent Application No. EP20898105.0, "Extender European Search Report," dated Dec. 17, 2021, 9 pages.

*Primary Examiner* — Christopher A Revak
(74) *Attorney, Agent, or Firm* — Culhane Meadows PLLC—Intellectual Property; Michael P. Dunnam

(57) ABSTRACT

A blockchain transaction manager implements a method of managing submission of blockchain transactions to a node in a blockchain network by validating a received blockchain transaction and enqueuing the validated received blockchain transaction in a transaction queue, preparing at least one transaction attribute of the received blockchain transaction and placing the received blockchain transaction in a persistence queue, digitally signing or certifying the received blockchain transaction, attempting to submit the digitally signed or certified blockchain transaction to the node, and polling a blockchain status of the submitted blockchain transaction. Processes are provided for automatically recalculating blockchain transaction processing fees in the blockchain transaction attributes. Processes are also provided for repairing transaction attributes when the blockchain transaction has been rejected and submitting the repaired blockchain transaction to the node. Also, nonces are automatically assigned to received blockchain transactions and reassigned when the associated blockchain transaction has been rejected.

32 Claims, 15 Drawing Sheets

Related U.S. Application Data

(60) Provisional application No. 62/948,060, filed on Dec. 13, 2019.

(51) Int. Cl.
*G06F 11/16* (2006.01)
*H04L 9/00* (2022.01)

(52) U.S. Cl.
CPC ........ *H04L 9/3297* (2013.01); *G06F 11/1687* (2013.01); *H04L 9/50* (2022.05)

(58) Field of Classification Search
CPC ............. G06F 11/1687; G06F 11/1402; G06F 11/1474; G06F 16/21; G06F 16/27
See application file for complete search history.

(56) References Cited

U.S. PATENT DOCUMENTS

| | | | |
|---|---|---|---|
| 10,762,506 B1* | 9/2020 | Cash | G06Q 20/206 |
| 11,095,431 B2* | 8/2021 | Srivastava | H04L 9/3263 |
| 2018/0096121 A1 | 4/2018 | Goeringer et al. | |
| 2018/0117446 A1 | 5/2018 | Tran et al. | |
| 2019/0096522 A1 | 3/2019 | Scriber et al. | |
| 2019/0325115 A1 | 10/2019 | Wilkinson et al. | |
| 2020/0007346 A1* | 1/2020 | Callan | H04L 9/3247 |
| 2020/0244435 A1 | 7/2020 | Shpurov et al. | |
| 2020/0349284 A1 | 11/2020 | Saket et al. | |
| 2020/0394176 A1 | 12/2020 | Wu et al. | |
| 2021/0058231 A1* | 2/2021 | Nogayama | G06F 21/64 |
| 2021/0091960 A1* | 3/2021 | Werner | H04L 9/50 |
| 2022/0103532 A1* | 3/2022 | Manevich | H04L 9/085 |

* cited by examiner

| 900 Transaction | |
|---|---|
| PK | Tx_Id: STRING |
| | Raw_Tx: JSON |
| | Status: STRING |
| | Hash: STRING |
| | Gas_Limit: STRING |
| | Gas_Price: STRING |
| | Retry_Count: INTEGER |
| | Processed: BOOLEAN |
| | Processed_Count: INTEGER |
| | Provider_Type: STRING |
| | Is_Contract: BOOLEAN |
| | Bucket_Name: STRING |
| | Network_Name: STRING |
| | createdAt: TIMESTAMP |
| | updatedAt: TIMESTAMP |

| 910 Contract | |
|---|---|
| PK | Tx_Id: STRING |
| | Raw_Tx: JSON |
| | Contract_Address: STRING |
| | Status: STRING |
| | Hash: STRING |
| | Gas_Limit: STRING |
| | Gas_Price: STRING |
| | Retry_Count: INTEGER |
| | Processed: BOOLEAN |
| | Processed_Count: INTEGER |
| | Provider_Type: STRING |
| | Is_Contract: BOOLEAN |
| | Bucket_Name: STRING |
| | Network_Name: STRING |
| | createdAt: TIMESTAMP |
| | updatedAt: TIMESTAMP |

| 920 Error | |
|---|---|
| PK | Tx_Id: STRING |
| | Raw_Tx: JSON |
| | Status: STRING |
| | Is_Contract: BOOLEAN |
| | Provider_Type: STRING |
| | Error: STRING |
| | Error_Code: STRING |
| | Hash: STRING |
| | Network_Name: STRING |
| | Bucket_Name: STRING |
| | createdAt: TIMESTAMP |
| | updatedAt: TIMESTAMP |

| 930 Application | |
|---|---|
| PK | App_Name: STRING |
| | createdAt: TIMESTAMP |
| | updatedAt: TIMESTAMP |

| 940 NetworkInfo | |
|---|---|
| PK | Network_Name: STRING |
| | Network_Name: STRING |
| | Host: STRING(2000) |
| | Connection_Object: STRING(2000) |
| | Is_Deleted: BOOLEAN |
| | updatedAt: TIMESTAMP |
| | createdAt: TIMESTAMP |

*FIG. 9*

BLOCKCHAIN TRANSACTION MANAGER

CROSS-REFERENCE TO RELATED APPLICATIONS

This application is a continuation of U.S. patent application Ser. No. 17/115,701, filed on Dec. 8, 2020, and entitled "BLOCKCHAIN TRANSACTION MANAGER" which claims priority to U.S. Provisional Patent Application No. 62/948,060, filed Dec. 13, 2019, and entitled "Blockchain Transaction Manager," both of which are hereby incorporated by reference in their entireties.

TECHNICAL FIELD

The application is directed to an intermediary system that sits between a running computer application and a blockchain network and assists the running application with the submission, monitoring, and acceptance of blockchain transactions.

BACKGROUND

Blockchain transaction pipelines face numerous challenges. Some challenges are common across blockchain platforms, such as delays between the submission of transactions and their acceptance into the shared ledger. Other challenges are highly platform-specific, for example, the rejections that occur due to transaction "nonce" numbering issues in Ethereum. It is desirable to provide solutions to these issues and to incorporate the solutions into a single interface that may address the common as well as the platform-specific challenges.

SUMMARY

The systems and methods described herein address the needs in the art by maximizing the rate at which an application may submit transactions to a blockchain network such as Ethereum, and to maximize the proportion of the transactions that succeed and become finalized, while minimizing human intervention. An interface is described herein that may be inserted between a user's application and a blockchain network to obtain the benefits of a robust transaction pipeline, status reporting, and error management. The blockchain transaction manager described herein addresses the challenges noted above through a combination of queues, algorithms for preparing transactions and iteratively adjusting their attributes in response to blockchain network conditions and polling the network to learn transaction status. These capabilities enable concurrency and automated re-sending after errors.

In a first aspect, a blockchain transaction manager is provided that receives blockchain transactions intended for a node in a blockchain network and manages submission of the blockchain transactions to the node in the blockchain network. The blockchain transaction manager includes a transaction management application that provides an interface to a user application that generates a blockchain transaction. The transaction management application receives necessary information about the blockchain network and identities submitting transactions and validates received blockchain transactions and enqueues the received blockchain transactions in a transaction queue. A transaction handler stores the blockchain network and identity information and prepares at least one transaction attribute of a received blockchain transaction, digitally signs or certifies the received blockchain transaction as applicable to the blockchain network using identity credentials previously supplied by the user application, and attempts to submit the received blockchain transaction to the node in the blockchain network. A blockchain poller observes and reports a blockchain status of submitted blockchain transactions.

In sample embodiments, the transaction management application assigns a universal unique identifier to the blockchain transaction for tracking purposes upon receipt. The transaction handler further enqueues the attempts to submit the received transaction to the node in the blockchain network to a tracking queue for tracking and stores status information for a blockchain transaction successfully submitted to the node in the blockchain network.

In other embodiments, a management activities scheduler receives transactions that have been rejected by the node in the blockchain network and retries the rejected transactions. Also, when initial polling of submitted blockchain transactions by the blockchain poller has exceeded a configurable maximum number of attempts, the management activities scheduler may schedule further polling of the blockchain status at a reduced rate by the blockchain poller to continue to track status of the submitted blockchain transaction.

In further embodiments, a transaction management console provides access to the transaction management application by a human user via an interactive interface. The transaction management console provides a list of blockchain transactions and their status to the user via the user's interactive interface. The transaction management console may further manage identity or transaction certification credentials for use with blockchain transactions.

The blockchain transaction manager may further include a database that stores a submitted blockchain transaction that has not been successfully written to the node in the blockchain network and that stores a reason that the submission was not successful and a status of the submitted blockchain transaction.

In a second aspect, a method of managing submission of blockchain transactions to a node in a blockchain network is provided. Sample embodiments of the method include validating a received blockchain transaction and enqueuing the validated received blockchain transaction in a transaction queue, preparing at least one transaction attribute of the received blockchain transaction and placing the received blockchain transaction in a persistence queue, digitally signing or certifying the received blockchain transaction as appropriate to the blockchain network, attempting to submit the digitally signed or certified blockchain transaction to the node in the blockchain network, and polling a blockchain status of the submitted blockchain transaction. In sample embodiments, polling the blockchain status includes polling the node in the blockchain network for information regarding progress of a submitted blockchain transaction toward acceptance in the blockchain network, and retrying the polling until the desired progress information is received. In sample embodiments, the polling decreases in frequency after expiration of a time period or a maximum number of polling attempts.

In sample embodiments, the method further includes receiving a response indicating whether the submission of the submitted blockchain transaction to the node in the blockchain network resulted in the transaction being accepted by the blockchain network, according to criteria appropriate to the blockchain network and writing the submitted blockchain transaction to a database with a status of the submitted blockchain transaction. When the status of the submitted blockchain transaction indicates that the submission was not successful, the method further includes storing in the database a reason why the submission was not successful.

In other sample embodiments, when the submitted blockchain transaction has been rejected by the node in the blockchain network, a repair algorithm is applied to at least one transaction attribute of the rejected blockchain transaction to create a repaired blockchain transaction. The repaired blockchain transaction is digitally signed, and attempts are made to submit the repaired blockchain transaction to the node in the blockchain network. When the submitted blockchain transaction has been rejected by the node in the blockchain network due to a retriable error, the submitted blockchain transaction is resubmitted to the node in the blockchain network until accepted or a retry limit is exceeded. When the retry limit is exceeded, availability of the transaction's nonce is indicated by adding a nonce value to a stored pool of available transaction nonces, the submitted blockchain transaction is written to an errored transaction table in a database, and/or the originally submitted raw blockchain transaction is extracted and the raw blockchain transaction is again prepared and sent using the same processes as newly received transactions.

In further sample embodiments whose blockchain network employs Ethereum-like transaction nonces, a nonce is automatically assigned to the received blockchain transaction. Automatically assigning the nonce to the received blockchain transaction may include, when multiple blockchain transactions for a same account and blockchain network are being processed concurrently, using a locking mechanism to ensure that a nonce is calculated for only one blockchain transaction at a time. When a blockchain transaction is not accepted by the node in the blockchain network after multiple retries, a nonce of the unaccepted blockchain transaction may be assigned to a pool of nonces available for reuse by the account associated with the unaccepted blockchain transaction. The method may further include, when assigning a nonce, considering whether the pool of available nonces contains any nonces for the account associated with the received blockchain transaction, and when the pool of nonces contains at least one nonce for the account associated with the received blockchain transaction, a lowest-valued nonce is selected and the lowest-valued nonce is assigned to the received blockchain transaction.

Automatically assigning the nonce to the received blockchain transaction may further comprise obtaining a nonce from the node in the blockchain network for the account ($N_{web3}$), obtaining a nonce last automatically assigned for the account ($N_{red}$), subtracting the nonce from the node in the blockchain network for the account ($N_{web3}$) from the nonce last automatically assigned for the account ($N_{red}$), and when $N_{red}$-$N_{web3}$ is greater than a predefined nonce window, then picking the nonce from the node in the blockchain network for the account ($N_{web3}$); otherwise a nonce is selected having a greater value. The method may further include, prior to digitally signing the received blockchain transaction, selecting a lowest available nonce for the account, and when the pool contains a nonce having a lower value than the selected nonce, the selected nonce is exchanged with a lower-valued nonce from the pool and the lower-valued nonce from the pool is used for the received blockchain transaction.

In other sample embodiments, when the submitted blockchain transaction is rejected by the node in the blockchain network, a nonce of the rejected blockchain transaction is written to a pool of nonces and a lowest numbered nonce in the pool is used by a next received blockchain transaction prepared for submission to the node in the blockchain network. The rejected blockchain transaction is automatically assigned a new nonce before again digitally signing the rejected blockchain transaction for resubmission to the node in the blockchain network.

In still further sample embodiments, the at least one transaction attribute comprises an amount a submitter of the blockchain transaction is offering to pay in blockchain transaction fees per proxy unit of computation and storage costs that will be incurred by a blockchain network containing the node in the blockchain network for processing of the blockchain transaction. The amount may be automatically calculated based on an amount associated with blockchain transactions recently accepted in the blockchain network. The method may also include automatically calculating a maximum amount of computation and storage proxy units (G) a transaction sender indicates they are willing to compensate for processing the blockchain transaction by a blockchain network containing the node in the blockchain network. Such a method may include obtaining a limit of previously mined blocks from the blockchain network ($G_{mb}$), wherein the limit includes a maximum of a sum of a maximum amount of proxy computation and storage units a transaction sender indicates they are willing to compensate for processing selected blockchain transactions that are to be mined into a single block by the blockchain network containing the node in the blockchain network, and obtaining an estimate of an actual amount of proxy computation and storage units required to process the transaction ($G_{db}$). Then, when $G_{db}>=G_{mb}$ assigning $G=G_{mb}*\alpha$, where $\alpha<1$, and when $G_{mb}>G_{db}$ then calculating a ratio $R=G_{mb}/G_{db}$ and finding G as follows:

when (R>=0 and R<=a configurable ratio $CR_1$, where $CR_1>0$, then $G=G_{db}*\beta$;

when (R>$CR_1$ and R<=a configurable ratio $CR_2$, where $CR_2>CR_1$, then $G=G_{db}*\gamma$; and when (R>$CR_2$) then $G=G_{db}*\delta$, where $\delta>\gamma>\beta>1$.

G is then added to the blockchain transaction before digitally signing or certifying the blockchain transaction as appropriate for the blockchain network and attempting to submit the digitally signed or certified blockchain transaction to the node in the blockchain network.

In other embodiments, when the submitted blockchain transaction is rejected by the node in the blockchain network due to an amount a submitter of the blockchain transaction is offering to pay in blockchain transaction fees per proxy unit of estimated computation and storage costs that will be incurred by a blockchain network containing the node in the blockchain network for processing of the blockchain transaction being too low or too high, a maximum amount of computation and storage proxy units a transaction sender indicates they are willing to compensate for processing the blockchain transaction by a blockchain network containing the node in the blockchain network is adjusted up or down by a predetermined percentage and the blockchain transaction is resent to the node in the blockchain network after a scheduled delay.

The embodiments described herein also encompass computer systems and computer readable media coded with instructions for implementing the methods described throughout this disclosure. For example, the systems and methods described herein may be implemented on a computing platform in the cloud to provide functionality for accessing and storing data to a blockchain platform as described herein.

BRIEF DESCRIPTION OF THE DRAWINGS

The present disclosure is illustrated by way of example and not limitation in the figures of the accompanying drawings, in which like references indicate similar elements and in which:

FIG. 9 illustrates the schemas used to represent transactions within the queues for the five entities that relate directly to transaction processing in sample embodiments.

DESCRIPTION

Figure 1:
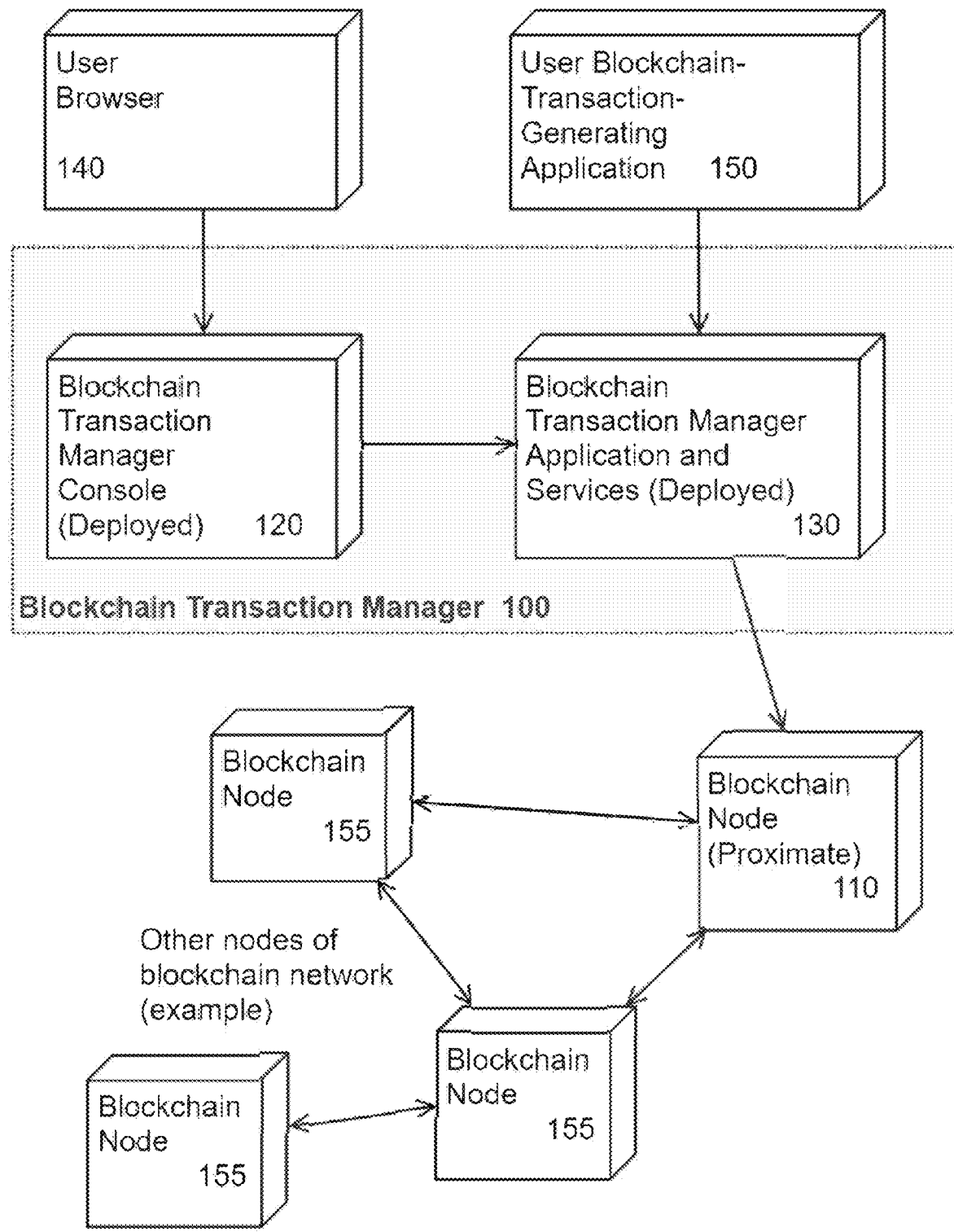
FIG. 1 illustrates a block diagram of the context of use of a blockchain transaction manager when deployed in a sample embodiment.

The following description with respect to FIGS. 1-15 sufficiently illustrates specific embodiments to enable those skilled in the art to practice them. Other embodiments may incorporate structural, logical, process, and other changes. Portions and features of some embodiments may be included in, or substituted for, those of other embodiments. Embodiments set forth in the claims encompass all available equivalents of those claims.

Terminology

Blockchain: A continuously growing list of records, called blocks, that are linked and secured using cryptography. Each block typically contains a cryptographic hash of the previous block, a timestamp, and transaction data. The blockchain is designed to be inherently resistant to modification of the transaction data. For use as a distributed ledger, a blockchain is typically managed by a peer-to-peer network that collectively adheres to a protocol for validating new blocks. Once recorded, the data in any given block cannot be altered retroactively without the alteration of all subsequent blocks, which requires collusion of the network majority.

Smart Contract: A computer protocol that provides the general-purpose computation that takes place on the blockchain or distributed ledger. The smart contract transactions may be simple or may implement sophisticated logic. The resulting transactions are typically transparent to ledger participants, trackable and irreversible. Various distributed ledger technology platforms such as Ethereum have implemented types of smart contracts. In the case of Ethereum, smart contracts are high-level programming abstractions that are compiled down to bytecode and deployed to the Ethereum blockchain for execution.

Node.js®: A free open source server environment that executes JavaScript code outside of a browser. Node.js® is an asynchronous programming platform built on the Chrome browser's JavaScript runtime. More information about Node.js® may be found at "About Node.js®." Node.js, Node.js Foundation, https://nodejs.org/en/about/.

Ethereum Terminology: Sample embodiments described herein will be described with respect to the commonly used blockchain platform known as Ethereum. As Ethereum papers, implementations, and related libraries sometimes use different names for the same concept, the following terms will be used herein in a manner consistent with the following meanings:

Platform Attributes

Ether: The intrinsic cryptocurrency of the Ethereum blockchain platform. One use of this currency is to compensate miners for their work on behalf of the network. With regard to blockchain platforms similar in this aspect to Ethereum, "Ether" as used herein should be considered synonymous to the analogous intrinsic cryptocurrency of the platform being considered.

Miner: Entities that evaluate blockchain transactions and perform computations that collectively maintain the integrity of blockchain data in their network.

Transaction Life Cycle Terminology

Submitter: The blockchain network identity that is associated with a transaction, the identity credentials for which are used to digitally sign the transaction, and against whose cryptocurrency account fees will be charged.

Sending/Sent: Initial communication (or attempt) of a transaction to a proximate node in the blockchain network.

Rejected: Transaction was refused during the initial communication to the proximate node in the blockchain network due to an error.

Pending: Transaction was accepted during the initial communication, has been placed in the pending transaction lists and is being broadcast to other blockchain network nodes, but is not known to have been mined yet.

Mined: A transaction has been evaluated, included in a block, and appended to the blockchain (at least from the perspective of a given node). The transaction may have Succeeded or Failed.

Receipt: A piece of data originating from the proximate node in the blockchain network indicating that a transaction is known to have been mined, including information about success or failure. ("Receipt" is a term used by the popular web3 software library used with Ethereum nodes.)

Succeeded: A mined transaction executed completely and without errors when it was mined.

Failed: A mined transaction produced an error when it was mined, did not execute completely, and had no effect other than the recording to the block of failure details and the charging of fees to the submitter's cryptocurrency account for the attempt. Failures may occur for a variety of reasons, some of which are described herein.

Finalized: A transaction whose block is extremely unlikely to be replaced in the blockchain due to the discovery that another part of the blockchain network has made more progress in confirming transactions. There is no formal specification determining this, but it is usually based on the number of blocks subsequently appended.

Simple Transaction: A blockchain transaction that does not contain a new smart contract.

Contract Transaction: A blockchain transaction that contains a new smart contract.

Transaction Attributes

Gas: Standardized proxy unit amount for estimates of the combined computation and storage costs that will be incurred by an Ethereum-like blockchain network if a given transaction is processed, which becomes the basis for charging a fee to the transaction's submitter. "Gas" is both the proxy unit and the term for the total amount of such an estimate.

Startgas: Maximum proxy computation and storage units a transaction sender indicates they are willing to compensate for a proposed transaction. (This is the web3 library term; the Ethereum yellow paper calls this "gas limit.")

Gasprice: The amount a transaction submitter is offering to pay to the account that mines the transaction, in cryptocurrency fees per unit of gas consumed during the processing of that transaction.

Intrinsic gas: Gas a transaction would use before any smart contract code executes. It includes a baseline transaction gas charge plus a gas charge for any data supplied as parameters with the transaction. (The latter is calculated because input parameters will be recorded to the blockchain even if the transaction fails.)

Nonce: All discussion of nonces herein relates to the required sequential numbering of a submitter's transactions on the Ethereum and similar blockchain platforms.

Network Attributes

Block gas limit: When pending transactions are selected by a miner on the network to be mined into a single block, this is the maximum of the sum of startgas allowed for all of the selected transactions. Each Ethereum network, or network based on a platform with a similar structure for compensating miners, has its own limit, which increases or decreases a small amount after each new block is appended.

Blockchain Node Attributes

Nonce window: The highest nonce value a transaction may have and still be accepted by a node, expressed as a delta higher than the nonce of the last transaction that was sent by the node to the blockchain network for a given submitter identity. The effect of the nonce window is to limit the number of transactions that may be in the node pending broadcast for each identity. The nonce window may be configured for each node in the blockchain network.

Proximate node: The node in the blockchain network with which a user or application is most directly communicating, in order to interact with the blockchain network as a whole.

Overview

Blockchain Transaction Challenges

The blockchain transaction manager described herein addresses the difficulties applications face when working with a blockchain network such as Ethereum directly or when using currently popular support libraries. As noted above, the description herein is provided with respect to the commonly used Ethereum blockchain network, but it will be appreciated by those skilled in the art that the techniques described herein also may be used with other blockchain networks such as AION, ArcBlock, EOS, NEO, Hyperledger® Fabric, Hyperledger® Sawtooth, NxT, QTUM, Quorum, Smilo, Tezos, TRON, Wanchain, or Zilliqa. The terminology used herein is with respect to the Ethereum blockchain network. Corresponding terms would be used in the context of the other blockchain networks, such as those mentioned.

1. Synchronous Wait for Transactions to be Mined or Finalized

Time delays for transactions to be added to blocks, or to achieve "finality" by some measure, is a challenge common to most blockchain platforms. Naïve applications may take a "fire and forget" approach, sending transactions to a proximate node in the blockchain network and proceeding with the presumption that they will succeed until later activities prove otherwise. Others wanting more certainty may elect to wait a typical period of time for a transaction to be mined or finalized before proceeding. However, neither of these approaches is ideal: one leads to increased uncertainty for subsequent processes, and the other causes minutes of synchronous wait time.

2. Transaction Stoppage Caused by Nonce Gaps

A second category of difficulty relates to the concept of transaction "nonces" employed by blockchain platforms like Ethereum These are numbers that the network expects to be assigned sequentially to the transactions submitted for a given blockchain identity. They are assigned by the submitter but in practice submitters often delegate this to support code libraries associated with the blockchain network. An Ethereum-like network will attempt to process transactions in nonce number order, which may lead to transaction delay or failure for a variety of reasons. Transactions with values lower or much higher than those already processed will fail outright. Values missing from the sequence will cause transactions with subsequent nonces to be ignored until the gaps in sequence are filled in.

3. Need for Manual Reconfiguration for Changes in Transaction Fee Expectations

To be accepted, transactions in blockchain platforms with miner compensation mechanisms like Ethereum's are accompanied with a maximum amount the transactor is willing to pay in fees to the network, based in part on gasprice as defined above. Underestimating gasprice may lead to long or indefinite delays as more generous transactions are selected for inclusion in the blockchain. The latter is compounded as a challenge by the fact that the preferred price is volatile over time. But setting gasprice high enough to account for that volatility means overpaying most of the time. So, most transactors manually adjust the price their applications propose on a regular basis and also when they notice transactions are not going through (which transactions must then be submitted anew).

4. Difficulties Discovering and Handling Blockchain Transaction Rejections and Failures Nonces and transaction fees are just two sources of transaction rejection and failure. They and others, including errors raised by smart contracts themselves, may be difficult to detect due to the asynchronous nature of blockchain processing and unfriendly error reporting from the platform. Once detected, they may be difficult to address. The following describes some of the specific error conditions relevant to the blockchain transaction manager described herein.

Nonce Low Error

Assignment of nonces to a transaction is designed as a sequential process. Each transaction is bound with the nonce (an integer value) to avoid the double spending problem. For each proposed transaction, the nonce is required to be one greater than the prior transaction's nonce. The nonce low error occurs when a transaction is proposed by a submitter to the network with a nonce that is lower than that of the latest transaction that had previously been mined, for which they were the submitter. This situation may occur during attempts to horizontally scale transaction-sending applications, for example if naïve nonce-assignment algorithms are used, such as those found in popular Ethereum support libraries. Those libraries auto-assign nonces based on their own local observations of the submitter's highest nonce. When multiple instances try to do this concurrently, duplicate nonce assignment is likely, with the second one processed getting the failure result.

Gas Low, Gas Exceeded, and Out-of-Gas

As described above, transactions in blockchain platforms like Ethereum are accompanied with a maximum amount the submitter is willing to pay in fees to the network. The amount is partially based on the transaction attribute startgas, the submitter's cap on the allowable proxy computation and storage units for the transaction. There are three situations in which the amount chosen for startgas may cause problems for a transaction. The first two are determined by the node in the blockchain network when the transaction is sent to it. Every transaction in these platforms consumes a minimum amount of proxy units for computation and storage called its "intrinsic gas," which may be calculated from the transaction itself. So, if startgas is set less than this, the transaction is immediately rejected, with a gas low error. Assigning startgas too high is also problematic. Transactions will be rejected with the gas exceeded error when startgas is higher than the block gas limit, since the node knows it could never fit in a block under current network conditions. The third gas-related issue is only discovered when a transaction is mined, since the exact storage and computation needs of the transaction only become known when it is actually executed. If startgas is lower than the actual gas needed, the miner will stop processing the transaction as soon as the limit is hit and records it to the blockchain as an out-of-gas failure. The effects of the transaction are recorded, but since the computing work was done by the network, a fee is still levied based on the full startgas amount against the Ether account of the submitter.

Remote Procedure Call (RPC) not Responding

Transaction-sending applications typically interact with proximate nodes in the blockchain network via remote procedure calls. It presents a challenge to the application if the node becomes temporarily unresponsive to those calls and a transaction is not received as a result.

Insufficient Funds

Transactions are rejected with the insufficient funds error if the product of gasprice and startgas is greater than the amount of Ether in the submitter's account when the transaction is sent.

"Known Transaction" Error

In order for nodes to identify whether they have already been informed of a proposed transaction, each transaction's attributes are distilled to an identifying hash. The hash is a value that will be unique for those attributes, but identical for a subsequent transaction if it has the exact same attributes. A node that is sent a transaction with the same hash as one already on its pending transaction list will reject it with the known transaction error. (If the prior transaction with the same hash was already mined then the subsequent one will also fail, but with a nonce low error.)

5. Loss of Transactions Due to System Failures

An automated system to submit blockchain transactions involves multiple steps, including adding transaction attributes, digital signing, sending to blockchain (perhaps passing through third-party libraries along the way) and persisting status and other data. Applications managing this process on their own are susceptible to losing transactions or data at any of these steps if handling of errors, exceptions, or service failures is unsophisticated.

Thus, prior to implementation of the blockchain transaction manager described herein, applications using blockchain networks such as Ethereum faced stopping and waiting for the blockchain network transaction to be accepted ("mined"). Sometimes the transaction would be blocked due to tricky transaction numbering ("nonces") as well as frequent reprogramming unit cost estimates ("gas") for transaction fees. Also, the application had to handle all blockchain network transactions errors.

Solutions to Blockchain Transaction Challenges

The blockchain transaction manager described herein addresses the challenges noted above through a combination of queues, algorithms for preparing transactions and iteratively adjusting their attributes in response to blockchain network conditions, and polling the network to learn transaction status. These capabilities enable concurrency and automated re-sending after errors.

1. Asynchronous Concurrent Transaction Processing

The blockchain transaction manager in sample embodiments addresses two of the major challenges noted above through the use of a robust queued transaction pipeline followed by polling of the network to track transaction success or failure. This allows user applications to submit transactions without waiting for final confirmation. It also eliminates transaction loss because subsequent queues for each step hold them until success or failure of the step's processing is confirmed. The queue pipeline mediates initial submission; addition of attributes like gasprice, nonce, and gaslima; digital signing; and network confirmation. Queues also manage retries and failure reporting.

As an additional benefit, the queues enable logically concurrent processing at each step. The blockchain transaction manager's service components are designed for such concurrency, with the backing of caches for shared state where required (e.g. for determining available nonce values).

When handled manually, blockchain transactions such as Ethereum transactions are usually tracked on the basis of a "transaction hash" of all characteristics of the transaction that is used to track the transaction. For example, a transaction hash is calculated and returned by a node in the blockchain network when a transaction is successfully sent to it with all needed attributes and with it digitally signed. The blockchain transaction manager described herein, on the other hand, accepts partial ("raw") transactions from user applications. This is desired because for asynchronous processing certain attributes are ideally calculated just prior to actual submission. As a result, an additional identifier may be needed for a transaction to be tracked across the entire process, including the possibility that it may be rejected by the node in the blockchain network.

The blockchain transaction manager assigns a universal unique identifier (UUID-random) to each transaction for tracking purposes when it is received via an Application Programming Interface (API) such as a Representational State Transfer (REST) API that uses HTTP requests to get, put, post, and delete data. In sample embodiments, the blockchain transaction manager uses version-4 UUIDs, randomly generated. A transaction hash is still generated if the transaction is later accepted by the node in the blockchain network, as will be the case in most embodiments. The hash is then also associated with the transaction ID and made available to the calling application.

Although this asynchronous processing of transactions could be achieved using a variety of programming platforms, the approach of the blockchain transaction manager in sample embodiments is to choose one with strong support for asynchronous processing and well-tested libraries for interacting with the blockchain network, such as exist for the Ethereum blockchain platform.

2. Automated Nonce Assignment

The blockchain transaction manager minimizes the nonce-related challenges described above through thoughtful automated assignment of nonces to incoming transactions. The nonce calculation becomes especially important when multiple transactions from the same account are processed concurrently. For example, the Ethereum network only broadcasts a transaction if its nonce is an integer value and greater by one than the nonce of the previous transaction communicated to the network. If the same nonce is assigned to multiple transactions, then the Ethereum blockchain network accepts whichever it receives first and rejects the others.

The nonce assignment algorithm in sample embodiments of the blockchain transaction manager protects against these situations by implementing the following steps:

1) If multiple transactions for the same account and network are being processed concurrently by the blockchain transaction manager, then use a locking mechanism and ensure that the nonces are calculated for only one of those transactions at a time.

2) Note that any time a transaction fails after multiple retries, its assigned nonce is added to a pool of nonces that may be reused for the account associated with the transaction (described below). Check if this pool contains any nonces for the account of the transaction being processed. If so, select the lowest-valued one, remove it from the pool, and assign it to the transaction being processed. If not, continue with step 3.

3) Get the nonce from the blockchain network for the given submitter's account: $N_{web3}$.

4) Obtain the nonce last assigned by the blockchain transaction manager for the given account: $N_{red}$.

5) Subtract the nonce from step 3 from the nonce from step 4: $N_{red}-N_{web3}$. If the difference is greater than the nonce window (see node attribute definitions above), then pick the nonce of step 3. In other words, if $N_{red}-N_{web3}>$nonce window, then $N=N_{web3}$.

6) Otherwise, compare the nonces from step 3 and step 4 and select whichever has the greater value; i.e., if $N_{red}>N_{web3}$ then $N=N_{red}$ else $N=N_{web3}$.

7) Just prior to the digital signing of the transaction, repeat the check similar to the one in step 2 to be certain the lowest available nonce is used. If the pool contains a lower value than the nonce assigned in steps 1-6, exchange the assigned nonce with the one in the pool and use the one from the pool for the transaction.

3. Automated Execution Cost Estimation

To avoid the difficulties described above with under- or over-estimating transaction fees, the blockchain transaction manager estimates cost attributes for each transaction individually.

Gasprice is calculated based on the gas price associated with transactions recently accepted in the network. In a sample embodiment, the popular web3 library's calculation based on median gas prices in the past few blocks may be used.

Calculation of the maximum gas (smartgas) allowed for the transaction in a sample embodiment includes the following steps:

1) Obtain the block gas limit of the previous mined block from the blockchain network: $G_{mb}$.

2) Obtain an estimate of the actual gas that will be required by the transaction. (The web3 library estimates this based on the data passed and/or simulating execution of smart contract calls): $G_{db}$.

3) If $G_{db}>=G_{mb}$ then $G=G_{mb}*CF_0$, where $CF_0$ is a configurable factor.

4) If $G_{mb}>G_{db}$ then calculation of G depends upon how much $G_{mb}$, is greater than $G_{db}$. Calculate the ratio $R=G_{mb}/G_{db}$, then find G as follows:

If (R>=0 AND R<=$CR_1$, where $CR_1$ is a configurable ratio, where $CR_1$>0) then $G=G_{db}*CF_1$, where $CF_1$ is a configurable factor;

If (R>$CR_1$ AND R<=$CR_2$, where $CR_2$ is a configurable ratio, where $CR_2$>$CR_1$) then $G=G_{db}*CF_2$, where $CF_2$ is a configurable factor;

If (R>$CR_2$) then $G=G_{db}*CF_3$, where $CF_3$ is a configurable factor.

5) If the transaction is a sending of Ether currency with no arbitrary message data (in other words a "value" attribute is present but "data" is missing or empty in transaction attributes), then startgas is a configurable amount of Ether, $G_{value}$.

6) If the transaction is a sending of Ether currency with arbitrary message data (in other words, both "data" and "value" are present), then startgas is the sum of calculated gas in above step 4 and the configurable value from step 5, $G_{value}$; that is: startgas=$G_{value}$+G.

Once calculated, these attributes are added to the raw transaction, which then proceeds to digital signing and sending to the specified blockchain network.

4. Retries for Transaction Preparation and Sending

The blockchain transaction manager breaks into two stages the process of getting a transaction to the node in the blockchain network. The first is transaction preparation, which includes adding the nonce and cost attributes. The second is sending, which includes digitally signing the transaction and passing it to the node in the blockchain network. When problems are encountered during either of these processes, the blockchain transaction manager's initial strategy to address them is a simple retry approach. The system simply tries again to prepare or send the transaction, up to a configurable number of times for each process.

If in either stage the maximum number of retries is exceeded, the transaction is moved to an error queue. After an intentional delay, the transaction returns to be prepared and sent again. Those that were unsuccessful due to rejection by the node in the blockchain network receive additional tailored handling as described below.

5. Rejected Transaction Handling

Handling transactions that were repeatedly rejected by the node in the blockchain network involves first avoiding future problems due to the transaction's nonce not being used, and second addressing the cause of rejection if possible. This section discusses the blockchain transaction manager's approaches to these operations.

Automated Nonce Reassignment

If a transaction is rejected by the node in the blockchain network, the nonce it was assigned will not appear in sequence in the list of nonces the node has received for the submitter's blockchain identity. This would cause a nonce gap as described above if it then only received subsequent transactions with subsequent nonces in sequence, skipping the number that is this transaction's nonce. To avoid this issue, the nonces of rejected transactions are immediately written to a list in the blockchain transaction manager's in-memory cache. The lowest numbered such nonce is then used by the next transaction prepared for the submitter, as described above. In this way, any gaps in nonce numbering are immediately filled.

Even if the cause of the rejected transaction may be addressed, it will not be sent again with the nonce originally assigned. Instead, automated nonce assignment is performed once again before again digitally signing it to be re-sent. This process is performed in all cases where the transaction fails after repeated retries, including for the reasons that are addressed below.

Automated Startgas Recalculation

A transaction that is rejected with a gas low or gas exceeded error when sent to the node in the blockchain network is addressed by adjusting startgas when it is prepared and sent again after the scheduled delay. The amount it is adjusted up or down is based on a percentage factor configurable for the system, for example, 20% increases for gas low and 10% decreases for gas exceeded.

Rejections Addressed by Delay and Reporting

For transactions that are rejected due to "RPC not responding" or "insufficient funds," the blockchain transaction manager assumes that the underlying causes will be addressed in time. No action is taken on the transaction other than writing to the error queue, so it may be prepared and sent again after the wait time. However, the reason is written to the database, along with the transaction's status, which enables monitoring by the user's application.

Handling "Known Transaction" Rejections by Changing Nonce

As described above, the "known transaction" rejection arises when a transaction is identical to one already submitted. Sample embodiments of the blockchain transaction manager assume the cause for this is that two coincidentally identical transactions were also assigned the same nonce. (The situation should be very rare if the blockchain transaction manager is handling all transactions for a given submitter but could arise in more complicated circumstances.) The cure for this is to strip the duplicate nonce from the transaction and assign an appropriate new one. This happens anyway when transactions are sent to the error queue and subsequently re-prepared and re-sent, so no additional handling is required beyond that provided for all rejections.

6. Transaction Status Polling

Having enabled user applications to submit a transaction asynchronously, the second important requirement of a fully automated transaction manager is to confirm that the transaction was executed by the blockchain network and whether that execution succeeded or failed (in terms of the intent of the transaction itself). Generally, this tracking will observe one of two situations: either a transaction will be typical and be mined within a relatively short and predictable period of time (e.g., seconds, a minute or two for the main public Ethereum network currently, or perhaps longer for other platforms), or mining will be significantly delayed due to issues with the network or the transaction itself. In anticipation of this, the blockchain transaction manager is implemented with two separate status polling approaches. The first is more intensive. During an initial period after being sent to the node, a record of the transaction is held in a queue with the records of other recently sent transactions. Each one is taken in order and the node in the blockchain network queried to see if the transaction has been mined. If so, appropriate action is taken based on the mining result. If not, it enters a retry queue for repeated intensive polling (e.g., a couple of times a minute), until a configurable retry limit is reached. At that point, the transaction is referred to a second polling approach, based on a job scheduler. The scheduler introduces a time delay before intensive polling is re-attempted. A two-phase schedule is supported, for example scheduling re-polling every 5 minutes up to five times, and then once an hour indefinitely thereafter, until polling indicates the transaction has been mined. This allows a balance to be struck between the use of network resources versus the timely reporting of transaction status.

7. Handling Database Failures

Interruptions in database availability is one of the potential sources of system failure alluded to above. The blockchain transaction manager handles this possibility differently depending on where in the transaction lifecycle the interruption occurs. In most cases, this handling involves subsequent database activities, such as writing transactions to an error table. If those writes are impossible due to broad database unavailability, the information is written temporarily to a different location (a text file, in the present sample embodiment) and an error handling routine may update the status to the database at a later time.

Database Failure in API Layer

If the database is not responding at the time a raw transaction is submitted by a user application, the blockchain transaction manager simply refuses to accept the transaction and provides an error return code to the REST API.

Database or Cache Failures During Transaction Preparation

Preparing and signing transactions involves reading blockchain network information from the database and obtaining identity credentials from secure storage. Errors in any of these operations will cause the activity to retry, up to a configurable maximum number of attempts. (Reading the cache is an exception; if the cache cannot be read, secure storage will be read instead.) If the error continues past a configurable maximum number of iterations, then subsequent handling depends on the specific problem. If the error occurred during the lookup of network information, the transaction is written to an error table, and will be retried after a scheduled delay. For all other errors, the transaction is written to the error table but not automatically retried. It may be retried manually by an administrator via the ETM Console, as described below.

Database Failure after Sending to Blockchain Node

After the proximate node in the blockchain network accepts a transaction, the blockchain transaction manager records its details to the database along with its status as being submitted. If for any reason it is unable to do so, the transaction is written to an error table noting the problem that occurred. It may then be retried manually via the ETM Console.

Database Failure after Polling

A database update is performed after each round of polling—either to reflect that a receipt was obtained indicating the transaction was mined, or to record the fact that the maximum number of retries was exceeded and that polling should be attempted again after a delay. In the sample embodiment, if the database is unavailable, these writes are made to a local text file pending resumption of database availability, at which time the information is written to the database as originally intended.

Database Failure During Scheduling of Errored Transactions

In a sample embodiment, a database is used instead of a queue to hold transactions that require error handling. Any database issues that arise during the periodic retrieval of those transactions are logged. Periodic attempts to retrieve the transaction(s) are ongoing, so temporary issues will self-correct after system administrators manually address the logged issues.

8. Bulk Transaction Processing

Given the ability to process and monitor transactions asynchronously, the ability for a client application to submit them in bulk is an appropriate convenience and is supported by the blockchain transaction manager.

Thus, the blockchain transaction manager described herein addresses the challenge of conventional blockchain networks by queueing the blockchain network transaction to be submitted when the transaction is prepared and the connection with the proximate blockchain network node is ready to accept it. Nonce are assigned automatically to prevent blocking, and the blockchain network transaction status is polled and obtained regularly. Also, the gas is assigned automatically based on the latest conditions. Many of the blockchain network errors are handled automatically, and a reporting is provided for those errors that cannot be handled automatically.

Sample Embodiments

Overview

The functionality of the blockchain transaction manager is achieved through the combination of a series of service components capable of taking action on blockchain transactions at different stages in their life cycles, including addressing failure and rejection situations. These components also interact with the blockchain network (e.g., Ethereum) to submit transactions and track their status. A series of persistent message queues hold transactions pending action or confirmation by those service components, and in-memory and persistent databases hold information about relevant blockchain identities and their transactions, which is needed by the service components in their work. The system is mainly intended to cater to applications having a need to generate or track blockchain transactions. A programming language-independent REST API with access to the service components is provided for this purpose. In addition, the API services a browser-based front-end "console" web application deployed on a web server or as a service on the local machine that offers direct access to a subset of blockchain transaction manager functionality by human users.

FIG. 1 illustrates a block diagram of the context of use of a blockchain transaction manager 100 when deployed in a sample embodiment. In the illustrated sample embodiment, the blockchain transaction manager 100 is configured as an Ethereum Transaction Manager (ETM™) to interface to an Ethereum blockchain network including a proximate blockchain node 110 and a plurality of blockchain nodes 155. As noted above, when used with other types of blockchain networks, the blockchain transaction manager 100 would interface to the respective nodes of the other type of blockchain network. As illustrated, the blockchain transaction manager 100 includes a deployed ETM™ Console 120 and deployed ETM™ application and services 130 as will be described in further detail below. The blockchain transaction manager 100 serves as a REST API driven interface to the Ethereum blockchain network including nodes 110 and 155 for blockchain transactions generated by the user's browser 140 and/or blockchain transaction generating applications 150 on the user's computer.

Queues and Service Components

As described above, much of the functionality of the blockchain transaction manager 100 arises from a life cycle of transactions passing via messaging queues to service components that are able to act upon them both locally and in the chosen Ethereum network. The components, the queues, their purpose, and the transaction flows at a high level are set forth in Table 1 below:

TABLE 1

| Service Component Name | Purpose |
| --- | --- |
| ETM_App | Provides REST API to user application and console; validates and enqueues incoming transactions. |
| ETM_TxHandler | Prepares transaction attributes, digitally signs transactions, attempts to send to blockchain, enqueues for tracking, and stores transaction status. |
| ETM_Polling | Observes and reports the blockchain status of submitted transactions. |
| ETM_Scheduling | Handles long-running recurrent activities: (1) receives rejected transactions and retries them; (2) more slowly polls the blockchain to track the status of submitted transactions which had timed out from ETM_Polling. |

The queues described in Table 2 feed these components with transactions to work with. The use of queues contributes to the ability of the blockchain transaction manager 100 to work on transactions concurrently and to allow the use of separate components and infrastructure at different stages of a transaction's life cycle.

TABLE 2

| Queue Name | Purpose |
| --- | --- |
| etm_app_transaction | Enqueues simple transactions, either raw ones or failed transactions that have been converted back to raw ones by the scheduler, pending preparation with network-related attributes. |
| etm_app_contract | Same as etm_app_transaction but for smart contract transactions. |
| etm_tx_persistence | Enqueues simple transactions that have been prepared with network-related attributes (nonce, gaslimit, and gasprice) and are pending digital signing and being sent to the Ethereum network node. |

TABLE 2-continued

| Queue Name | Purpose |
| --- | --- |
| etm_cont_persistence | Same as etm_tx_persistence but for smart contract transactions. |
| etm_app_transaction_retry | Enqueues simple transactions that had errors while being prepared with network-related attributes, during digital signing, or were rejected when sent to the Ethereum node, pending attempts to retry the process where the problem occurred. |
| etm_app_contract_retry | Same as etm_app_transaction_retry but for smart contract transactions. |
| etm_error | Enqueues transactions (both simple and smart contract) which have been repeatedly retried and rejected. These transactions will be written to database for handling by scheduler. |
| etm_tx_polling | Enqueues simple transactions that were just sent to the Ethereum node and are pending, and for which a transaction hash has been assigned by the node. |
| etm_cont_polling | Same as etm_tx_polling but for smart contract transactions. |
| etm_tx_polling_retry | Enqueues pending simple transactions for which active polling is ongoing to determine whether they succeeded or failed. Transactions in etm_tx_polling are moved to this queue before polling commences. |
| etm_cont_polling_retry | Same as etm_tx_polling_retry but for smart contract transactions. |
| etm_polling_fin_retry | Enqueues simple and contract transactions that have not been determined to have succeeded or failed after a preset number of polling attempts while in a polling_retry queue. |

Figure 2:
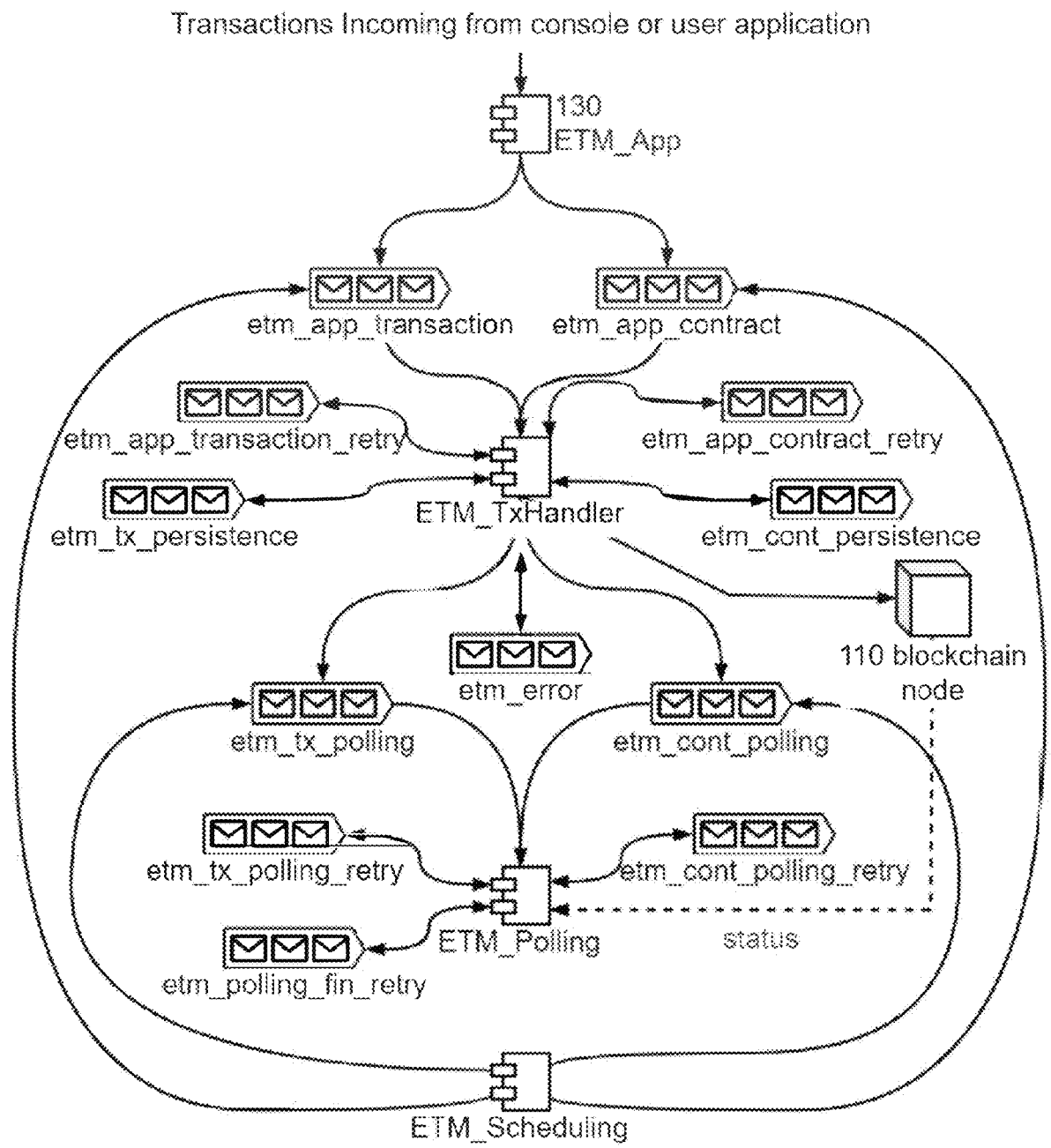
FIG. 2 illustrates the overall movement of transactions through the service components and queues of the blockchain transaction manager of FIG. 1 from a message queue perspective.

FIG. 2 illustrates the overall movement of transactions through the service components (Table 1) and queues (Table 2) of the blockchain transaction manager 100 from a message queue perspective. Additional detail regarding the activities involved with these movements, as well as the form of the data involved in each flow are explained in more detail below with respect to the operation of the blockchain transaction manager 100. Note that transactions flow to ETM_Scheduling via the database and not a queue, which is why no incoming transaction flow is shown in FIG. 2 for that Service component.

Persistence and Caching

The transaction lifecycle outlined above is supported by databases at various points. Those databases include:

Persistent Relational Storage

Usage: All transaction-related information received from the user, synthesized by the system, or polled from the Ethereum network is stored in persistent relational storage. This includes each transaction's status in the transaction life cycle of the blockchain transaction manager (an Ethereum Transaction Manager (ETM™) 100 in the case of an Ethereum blockchain network). Private blockchain keys are excluded from this storage.

Enhanced-Security Storage for Keys

Purpose: A blockchain transaction manager-using application provides the system with a public-private key pair for each Ethereum identity that will be associated with transactions it submits. This is desired so that the blockchain transaction manager 100 may digitally sign the transaction after adding or modifying its attributes. Storage for those keys requires additional security and isolation. An implementer of a transaction manager like ETM™ could use any encrypted object store or adapt the blockchain transaction manager 100 to use a purpose-built hardware- or software-based secure key storage, according to the desired level of security.

In-Memory Caching

Purpose: Increases performance by caching repeatedly read data elements including blockchain network connection information, submitter's identities, and nonce assignments for each identity.

User and Application Access Management

Security, other than key management and transaction signing, is an orthogonal concern to transaction management. Normal best practices apply, given the security needs of each use case. The following outlines the approach used in sample embodiments.

Two separate approaches to access management are used. First, features that are directly available to user applications via the REST API are authenticated using an identity management system. An identity for recognition by the blockchain transaction manager 100 itself, and associated credentials, are created in the identity system. The credentials are shared with any user application which is entitled to use this API through a process outside of the blockchain transaction manager and supplied back to the blockchain transaction manager 100 with each API call. Second, features that are accessed via the ETM console 120 use a separate JSON Web Token (JWT)-based authentication method. This allows additional users to be created by the ETM console's sole administrator identity, which is configured during deployment. Features accessible both ways, such as obtaining transaction status, may be authenticated either way, and are serviced by two separate API endpoints to allow this.

The ETM Console

Table 3 shows functionality that is available from the ETM Console 120. With the exception of retrieving transactions and their status, these functions are not available to user applications connecting via the REST API.

TABLE 3

| Functionality In Console | Access Required | Available To User Apps |
|---|---|---|
| Add user | Admin | No |
| View or edit user profile | Admin | No |
| Add or edit network (that is, a data record containing information required to access one specific blockchain via remote procedure calls to a proximate node) | Admin | No |
| Manage public-private key pairs for use with transactions | Admin | No |
| Obtain list of networks added | Admin | No |
| Obtain list of users added | Admin | No |
| Dashboard: obtain list of transactions and their status | Admin or User | Yes |
| Dashboard: retry rejected transactions | Admin | No |

Structure of Blockchain Transaction Manager

Additional detail regarding the construction of the system, focusing on the design and configuration that exists in advance of deployment (i.e., the static architecture, predefined data schemas, and pre-startup configuration), are described below with respect to FIG. 3 through FIG. 9. Note that the technologies mentioned for storage and queuing are placeholders. Those skilled in the art will appreciate that alternatives may be chosen for each based on other performance considerations.

Figure 3:
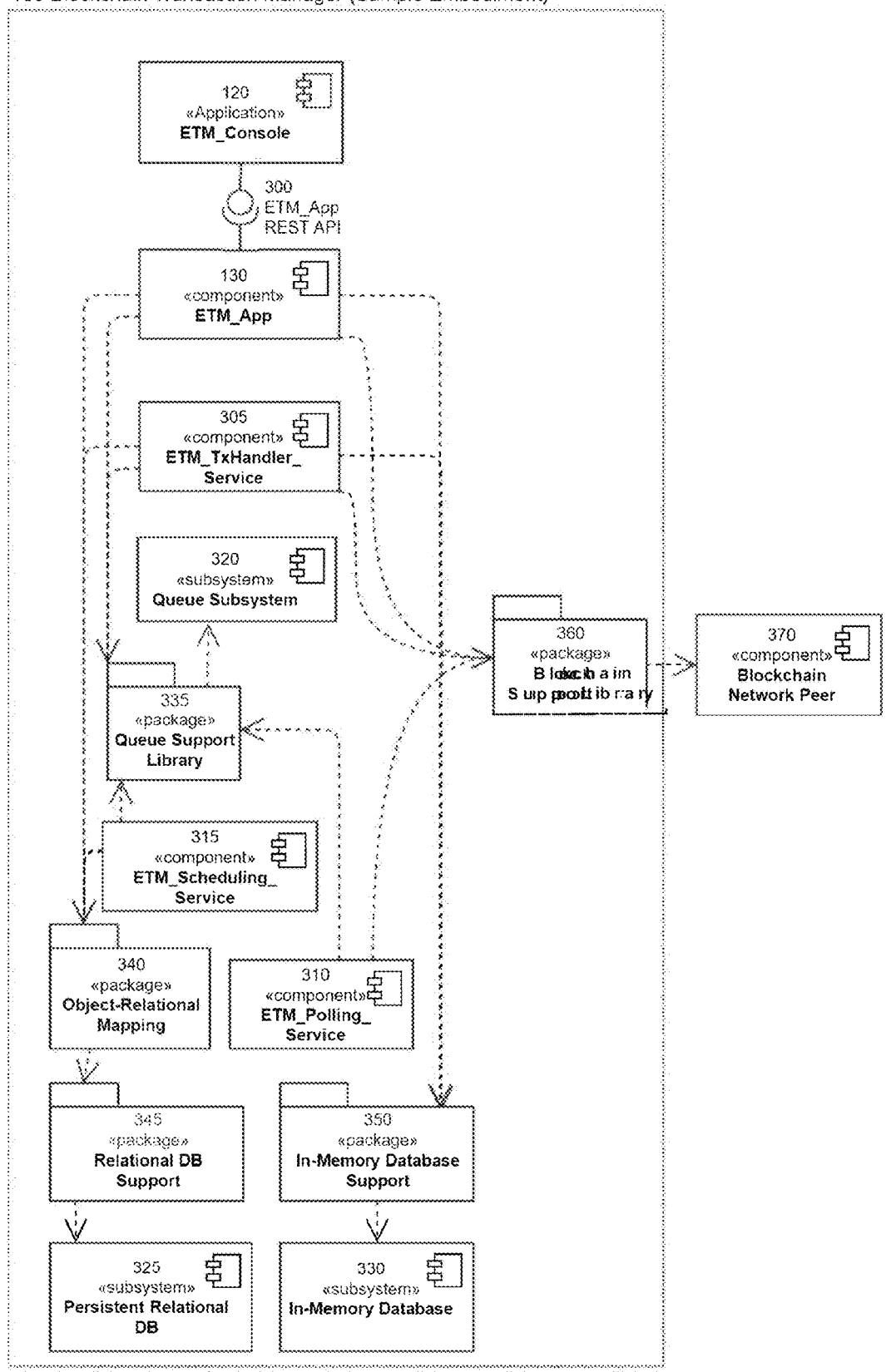
FIG. 3 illustrates a block diagram of the components of the blockchain transaction manager of FIG. 1 in a sample embodiment.

FIG. 3 illustrates a block diagram of the components of the blockchain transaction manager 100 in a sample embodiment. As illustrated, the ETM Console 120 communicates via the REST API 300 with the deployed ETM Application and Services 130, which, in turn, communicates with the illustrated application and services components. Such components include those described in Table 1 above, including the ETM_App 130, ETM_TxHandler_Service 305, ETM_Polling_Service 310, and ETM_Scheduling_Service 315. The components also include subsystems including a messaging Queue Subsystem 320, a Persistent Relational Database 325, and an In-Memory Database 330. The components may also include supporting libraries for these technologies, such as those in the sample embodiment, for: Queue Support Library 335, Object-Relational Mapping 340, Relational Database Support 345, and In-Memory Database Support 350. The components also may use a Blockchain Support Library 360 for interactions with the Blockchain Network Peer device 370. Further details regarding these components will be described below.

Static Structure of Console

As outlined above, the ETM Console 120 is an application that provides access to a subset of blockchain transaction management functions for human users. A high-level overview of the structure of the ETM Console 120 is illustrated in FIG. 4.

Figure 4:
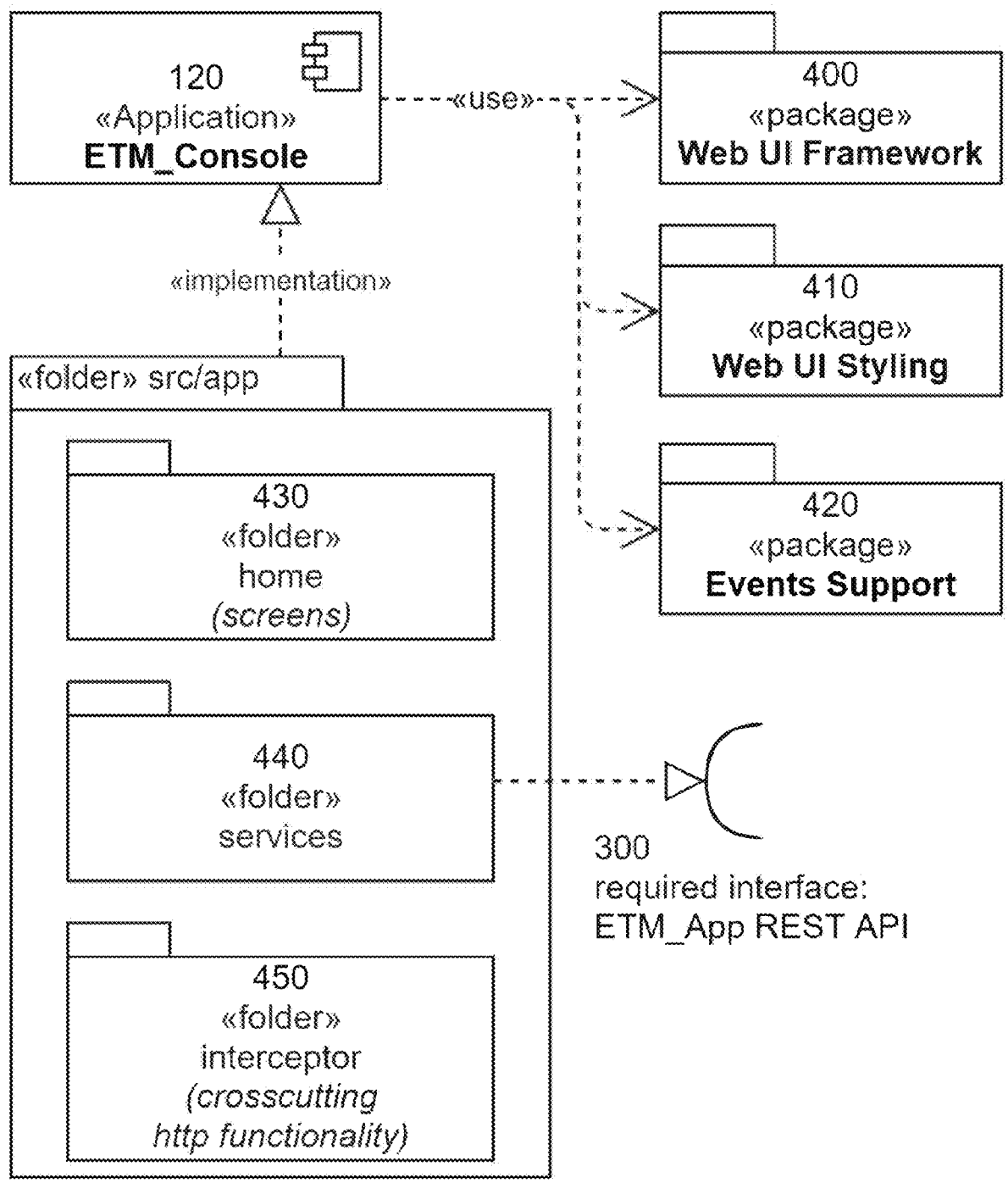
FIG. 4 illustrates a block diagram of the ETM Console of FIG. 1 in a sample embodiment.

FIG. 4 illustrates a block diagram of the ETM Console 120 in a sample embodiment. As illustrated, the ETM Console 120 may, in a sample embodiment, include packages such as a web user interface framework 400, a package for web user interface styling 410, and a package 420 for manipulating user interface events and API responses. The «folder» stereotyped packages for home screens (430), services (440), and interceptor (450) shown generally contain a set of code files that are interpreted on execution and communicate with the REST API 300. As is typical for interpreted languages, these individual files are the largest-grained units of code that may properly be considered components, until hitting the level of the service components themselves. Therefore, a folder organization is shown in lieu of subcomponents. Other embodiments may use code in compiled or any other form.

Static Structure of ETM Application

Figure 5:
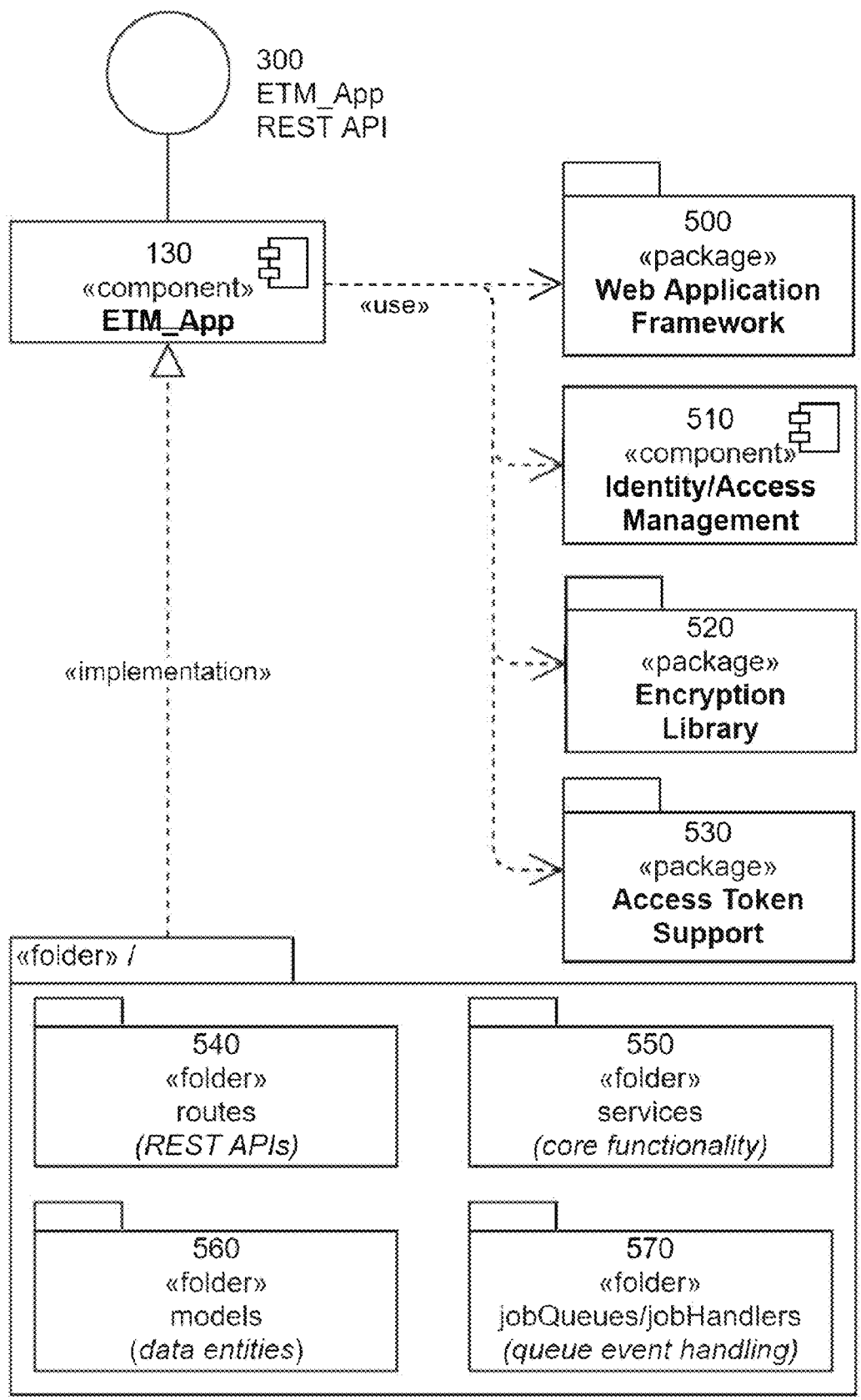
FIG. 5 illustrates a block diagram of the ETM application of FIG. 1 in a sample embodiment.

FIG. 5 illustrates a block diagram of the ETM application 130 in a sample embodiment. The ETM application 130 provides the REST endpoints for the system 100 and is a conduit for transactions to the first queues. A sample embodiment of the ETM application 130 is coded in a language such as Node.js®, which is suitable for use in the context of web application server with the support of a Web Application Framework package. FIG. 5 shows key elements of its implementation and dependencies. Dependencies which were shown in FIG. 4 are not repeated here or for the other service components described hereafter. Supporting code for publishing to and consuming from queues and interacting with databases is also present but not shown here or for any of the service components, for ease of description.

As illustrated in FIG. 5, the ETM application 130 interacts with the REST API 300 and uses a Web Application Framework package 500 identity/access management software 510, an Encryption Library package 520 for encrypting identity credentials, and an Access Token Support package 530. Once again, the «folder» stereotyped packages for routes (REST APIs) 540, services (core functionality) 550, models (data entities) 560, and jobQueues/jobHandlers 570 for queue event handling generally contain a set of code files which are interpreted on execution, but could be implemented with a different language and execution model.

Static Structure of Transaction Handling Service

Figure 6:
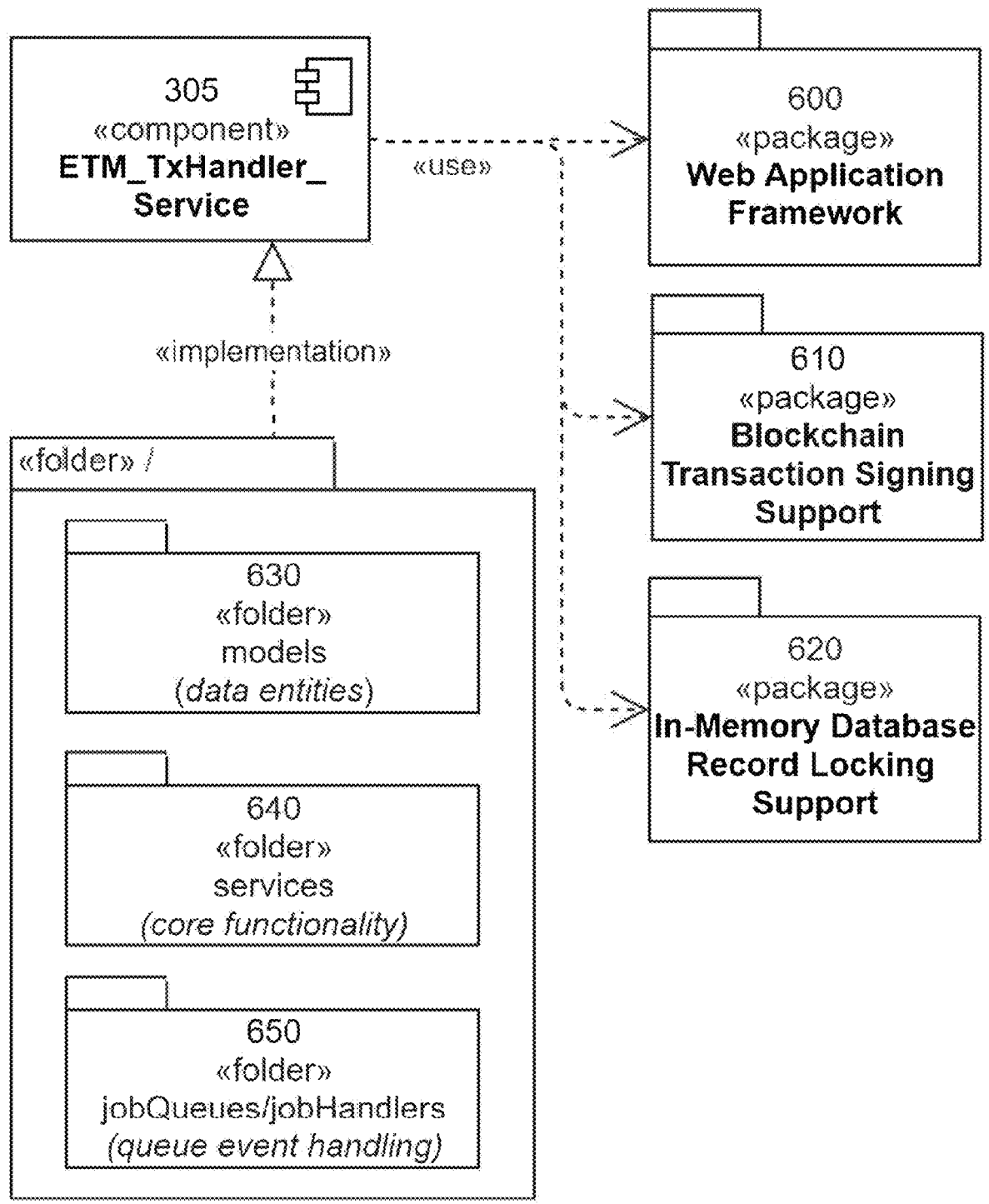
FIG. 6 illustrates a sample embodiment of the ETM_Tx-Handler_Service of FIG. 3.

FIG. 6 illustrates a sample embodiment of the ETM_TxHandler_Service 305. The ETM_TxHandler_Service 305 consumes transactions from a variety of queues and acts on them as appropriate for their life cycle stage. Like the polling and scheduling service components, the ETM_TxHandler_Service 305 has been implemented as a Web Application with no exposed API. As illustrated, the ETM_TxHandler_Service 305 uses packages including a Web Application Framework 600, Blockchain Transaction Signing Support software 610, and In-Memory Database Record Locking Support software 620. Once again, the «folder» stereotyped packages for models (data entities) 630, services (core functionality) 640, and jobQueues/jobHandlers 650 for queue event handling generally contain a set of code files which are interpreted on execution, but could be implemented with a different language and execution model. It will be appreciated that the "services" folder 640 contains the logic for operating on transactions as appropriate.

Because this is the one component that sends transactions to the blockchain network, it makes use of libraries for digital signing (Blockchain Transaction Signing Support 610) and for temporarily locking cache entries (In-Memory Database Record Locking Support 620). The latter is used to avoid clashes in nonce assignment.

Static Structure of Polling Service

Figure 7:
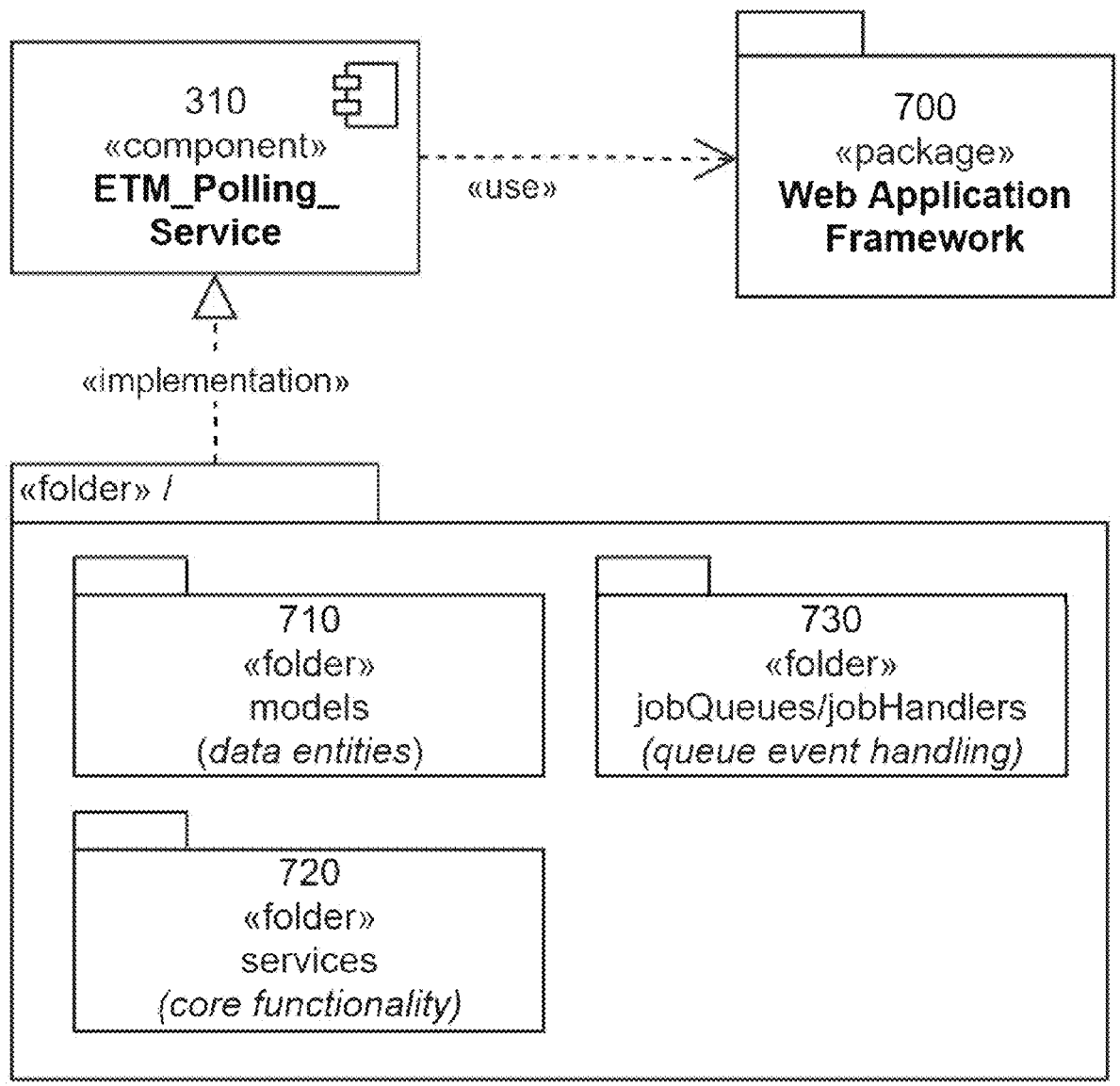
FIG. 7 illustrates a sample embodiment of the ETM_Polling_Service of FIG. 3.

FIG. 7 illustrates a sample embodiment of the ETM_Polling_Service 310. ETM_Polling_Service 310 tracks the status of transactions after they were sent to the blockchain network. The sample embodiment of ETM_Polling_Service 310 is also implemented using a Web Application Framework package 700. Once again, the «folder» stereotyped packages for models (data entities) 710, services (core functionality) 720, and jobQueues/jobHandlers 730 for queue event handling generally contain a set of code files which are interpreted on execution, but could be implemented with a different language and execution model. It will be appreciated that an additional software package (not shown) facilitates the parsing of attributes from transactions when they are finally found in a mined block in the blockchain ledger.

Static Structure of Scheduling Service

Figure 8:
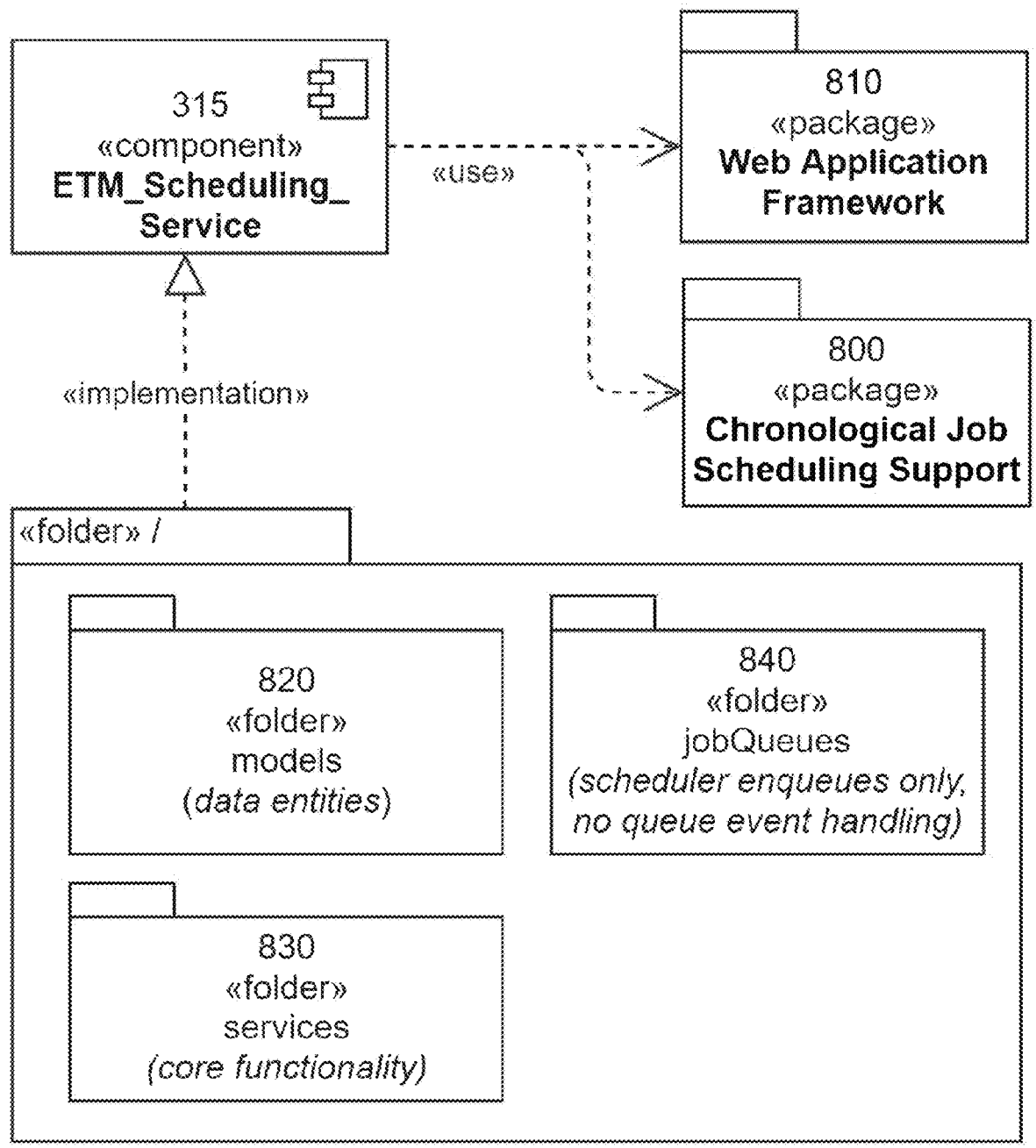
FIG. 8 illustrates a sample embodiment of the ETM_Scheduling_Service of FIG. 3.

FIG. 8 illustrates a sample embodiment of the ETM_Scheduling_Service 315. ETM_Scheduling_Service 315 handles long-running periodic processes. A Chronological Job Scheduling Support software package 800 facilitates chronological job scheduling in sample embodiments. The ETM_Scheduling_Service 315 is also implemented using a Web Application Framework package 810. Once again, the «folder» stereotyped packages for models (data entities) 820, services (core functionality) 830, and jobQueues 840 generally contain a set code files which are interpreted on execution, but could be implemented with a different language and execution model.

Database and Queue Entity Schemas

The schemas defined for persistent storage and queue storage in the blockchain transaction manager 100 that relate to transaction management are illustrated below in Table 4. The purposes of these schemas as used with the persistent database include providing persistent records of transactions and their progress through their life cycles; storing attributes of calling applications, users, and blockchain networks and nodes; and as an alternative to queues for moving transactions between service components, in particular to ETM_Scheduling_Service which does not require a first-in first-out queue.

Essentially the same schemas are also used to represent transactions within the queues (as JSON objects in a sample embodiment). Table 4 below and FIG. 9 describe the five entities that relate directly to transaction processing.

TABLE 4

| Entity | Each Record or Object Represents |
|---|---|
| Transaction | A simple or contract blockchain transaction in the raw stage or a simple transaction in subsequent stages of the transaction life cycle (FIG. 9, 900). |
| Contract | A contract transaction in the prepared or submitted stage of its life cycle (FIG. 9, 910). |
| Error | A simple or contract transaction that encountered an error during processing. (This does not include transactions that failed during mining.) (FIG. 9, 920) |
| Application | A user application that has submitted or may submit transactions to the blockchain transaction manager (FIG. 9, 930). |
| NetworkInfo | A blockchain network and node to which the blockchain transaction manager is configured to send transactions (FIG. 9, 940). |

Field values important to transaction management are discussed below.

REST API Data Schemas

The ETM_App service component 130 passes a variety of data objects in and out of the system via the REST API 300. The following are examples of the formats of JSON objects expected when taking in raw transactions:

Simple transaction request:
```
{
    "application": "<Application Name Goes Here>",
    "network": "<Network Name Goes Here>",
    "to": "0x0123456789abcdef0123456789abcdef01234567",
    "from": "0x9876543210fedcba0x9876543210fedcba987654",
    "data":"0xabcd12300000000000000000000000000000001a",
```

```
    "provider_type" : "http",
    "retry_count": "2"
}
```
Contract transaction request:
```
{
    "application": "<Application Name Goes Here>",
    "network": "<Network Name Goes Here>rinkeby",
    "from": "0x9876543210fedcba0x9876543210fedcba987654",
    "data":"0xabcd12300000000000000000000000000000001a",
    "provider_type" : "http",
    "retry_count": "2"
}
```

Bulk simple transaction request (supports up to 50 transactions per request):

```
[
{
"id": 200,
"application": "<Application Name Goes Here>",
"network": "<Network Name Goes Here>rinkeby",
"to": "0x0123456789abcdef0123456789abcdef01234567",
"from": "0x9876543210fedcba0x9876543210fedcba987654",
"data":"0xabcd12300000000000000000000000000000001a",
"provider_type" : "http",
"retry_count": "2"
},
{
"id": 201,
"application": "<Application Name Goes Here>",
"network": "<Network Name Goes Here>rinkeby",
"to": "0x0123456789abcdef0123456789abcdef01234567",
"from": "0x9876543210fedcba0x9876543210fedcba987654",
"data":"0xabcd12300000000000000000000000000000001a",
"provider_type" : "http",
"retry_count": "2"
},
etc...
]
```

The blockchain transaction manager's response when a simple transaction or contract transaction request has been accepted:

```
{
"result": "Transaction successfully received",
"tx_id": "12345678-90ab-cdef-1234-567890abcdef"
}
```

The blockchain transaction manager's response when a bulk simple transaction request has been accepted:

```
[
{
"id": 200,
"result": "Transaction successfully received",
"tx_id": "12345678-90ab-cdef-1234-567890abcdef"
},
{
"id":201,
"result": "Transaction successfully received",
"tx_id": "12345678-90ab-cdef-1234-567890abcdef"
},
etc...
]
```

It is noted that "tx_id" is the unique transaction identifier described above.

Important Field Values: Status

In the blockchain transaction manager 100, the data field "status" defines a coarse-grained point of progress of a transaction through its life-cycle. This field appears in entities (Transaction, Contract, Error) and code—see/config/configs/status.json in any service component. The allowable field values and the meaning of each are listed in Table 5.

TABLE 5

| Field Value | Meaning |
| --- | --- |
| Tx-Received | Transaction anywhere between being accepted by ETM_App 130 and being sent (including re-sending) to the blockchain node 110. |
| Tx-Error | Transactions which encountered issues during processing, other than failure during execution by the blockchain network (see Tx-Failed). |
| Tx-Submitted | Transaction which has been accepted by the blockchain node 110, but for which polling has not yet begun. |
| Tx-Pending | Transaction for which intensive polling is being done, or which has been turned over to the Scheduling service component 315 for slow polling. |
| Tx-Failed | A transaction which was determined by polling to have been mined into a block, but for which execution was reported as having failed. |
| Tx-Success | A transaction which was determined by polling to have been mined into a block and executed successfully. |

In sample embodiments, the blockchain transaction manager 100 is a Node.js® web application that provides a set of services to user applications, including:

Request acceptance, validation and queuing of transactions;

Transaction pricing, signing, and submission;

Transaction status polling and tracking;

Scheduling and periodic activities;

Dashboard and administrative functionalities; and

Report generation and mailing.

The blockchain transaction manager 100 also provides nonce management, iterative cost estimation and transaction lifecycle management.

Life Cycle of Transactions in the Blockchain Transaction Manager

The majority of the functionality of the blockchain transaction manager 100 is geared toward ensuring the success of individual blockchain (e.g., Ethereum) transactions, or dealing with (hopefully far less frequent) failures. As a result, much of the operation of the system may be understood by following the pathway of a transaction through the four blockchain transaction manager services and the blockchain network. The following description examines the activities involved in handling a normal transaction, and the alternative handling when there are problems with either the transactions themselves or the components operating on them.

Normal Transaction Life Cycle

Figure 10:
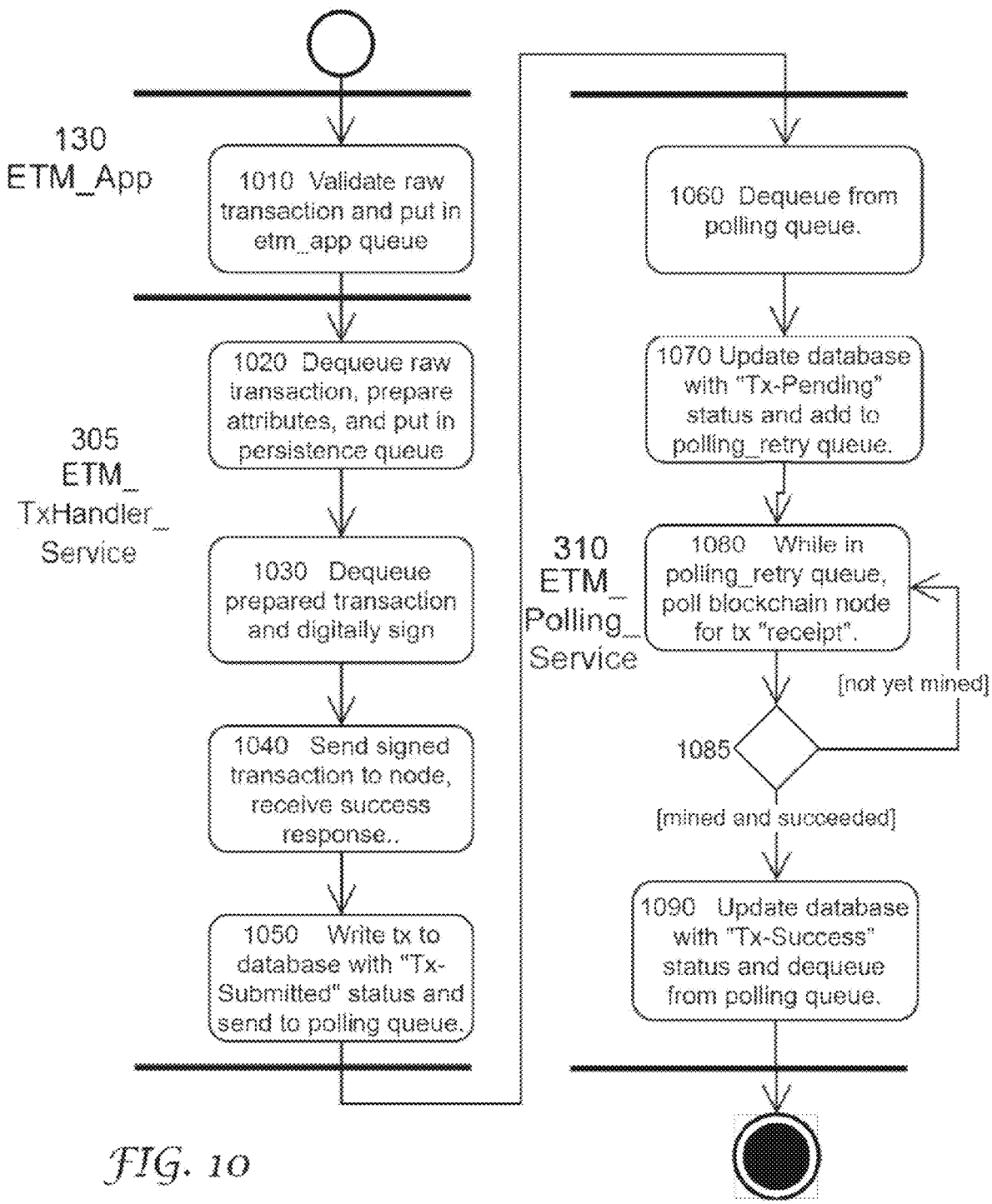
FIG. 10 illustrates a path for a transaction through its lifecycle involving trouble-free preparation and sending, prompt mining, and successful execution in a sample embodiment.

Activities performed by the system as a transaction progresses through its lifecycle, involving trouble-free preparation and sending, prompt mining, and successful execution, is illustrated in FIG. 10.

As illustrated, the ETM Application 130 validates the raw transaction at 1010 and puts the transaction in the etm_app queue.

The ETM_TxHandler_Service 305 then dequeues the raw transaction, prepares its attributes, and puts the raw transaction into a persistence queue at 1020. The prepared transaction is dequeued and digitally signed at 1030, and the signed transaction is sent to a node 110 of the blockchain network at 1040. Once a success response is received, the transaction is written to the database with "Tx-Submitted" status and sent to the polling queue at 1050.

The ETM_Polling_Service 310 dequeues the transaction from the polling queue at 1060 and updates the database at 1070 with "Tx-Pending" status and adds to the polling_retry queue. While in the polling_retry queue, the blockchain node is polled at 1080 for transmission "receipt." The polling result is evaluated at 1085. If the result is that the transaction has not been mined, then polling at 1080 is repeated. Once the transaction has been mined successfully, the database is updated at 1090 with "Tx-Success" status and dequeued from the polling queue. The process is then complete.

However, there are several possible errors that may occur during this process. Processing of the errors will now be described.

Delayed Receipt Flow

If no indication is received that a transaction was mined during the configurable timeframe for the first round of polling, the system sets it aside for a period of time and then starts a second round of polling. To implement this, a flag is set on the transaction in the database. Periodically, the ETM_Scheduling_Service 315 will query the database for a transaction with that flag set and a status of "Tx-Pending". After a configurable wait period, the flag is cleared, and the transaction is published to one of the polling input queues, etm_tx_polling or etm_contract_polling. This causes polling to begin again for the transaction. If polling again yields no receipt, this flow is repeated, with longer delays after a configurable number of iterations. This repetition for an unmined transaction will continue indefinitely until receipt is received.

ETM_App API Error Response Flow

A handful of transaction-related error conditions may be recognized before the transaction is placed in the raw transaction queue by the ETM Application 130. In this case, an error response is returned via the REST API 300. Errors taking this path include raw transaction failed validation, database not available, and queue not available.

TxHandler Repair and Re-send Flow

Figure 11:
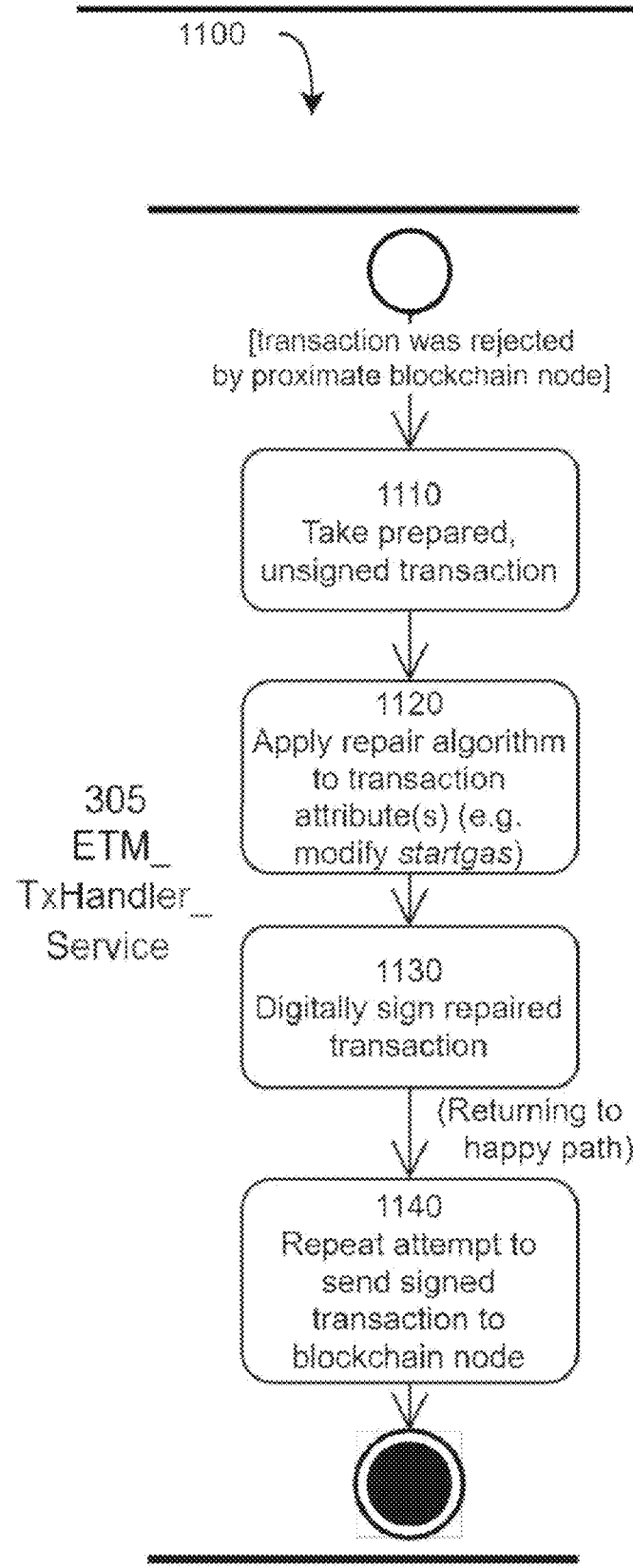
FIG. 11 illustrates a process for immediate transaction repair and resend in a sample embodiment.

If a transaction is rejected due to network-related transaction attributes like startgas, it is possible to adjust the attribute and resubmit. For example, FIG. 11 illustrates a process 1100 for immediate transaction repair and resend by the ETM_TxHandler_Service 305. Problems that may be handled via this path include Gas low and Gas exceeded. As illustrated, a prepared, unsigned transaction that was rejected by a blockchain node 110 (e.g., Ethereum node) is taken at 1110 and a repair algorithm is applied to the transaction at 1120 for repairing transaction attributes (e.g., modify startgas). The repaired transaction is digitally signed at 1130, and a repeat attempt to send the signed transaction to a blockchain node is performed at 1140. If no subsequent problems occur, the latter step would correspond to a resumption of the successful activity flow in FIG. 10, at 1040.

Retry Via Scheduler Error Flow

Figure 12:
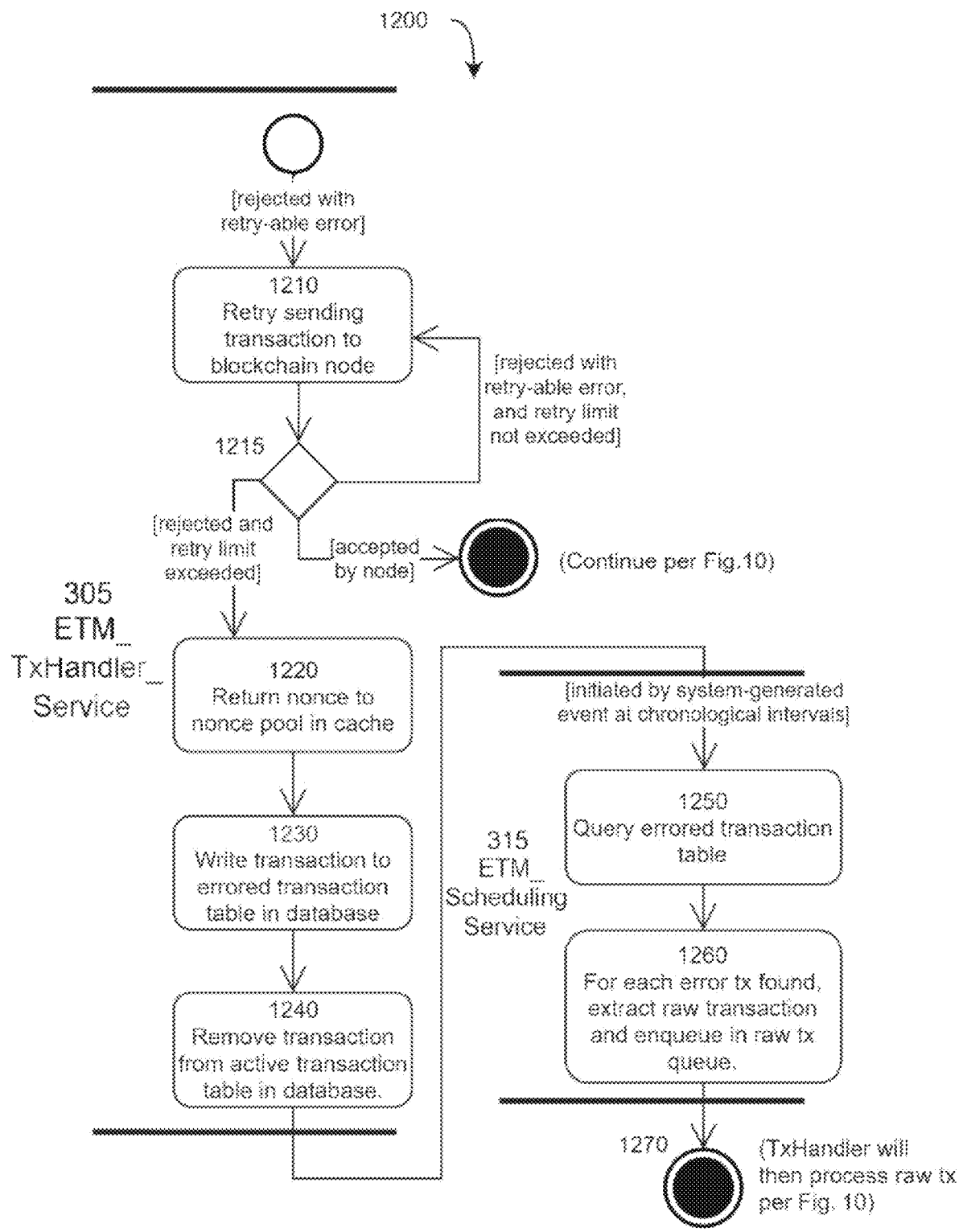
FIG. 12 illustrates a process for processing "retry-able" transaction errors in a sample embodiment.

Some errors are not addressed by immediate re-sending but might succeed if retried after a delay. In the blockchain transaction manager 100, these transactions are turned over to the scheduling service 315 for re-queuing as a raw transaction after a waiting time during which conditions might be improved. FIG. 12 illustrates a process 1200 for processing "retry-able" transaction errors in a sample embodiment. Errors handled via this path include insufficient funds, RPC not responding, certain database errors in the ERM_TxHandler_Service 305, and known transaction error.

As illustrated in FIG. 12, transactions that are rejected with a retry-able error are provided to the ETM_TxHandler_Service 305, which retries sending the transaction to the blockchain node at 1210. If the transaction is accepted at 1215, the transaction proceeds along the normal path described above with respect to FIG. 10. If the transaction is again rejected with a retry-able error, the ETM_TxHandler_Service 305 retries sending the transaction to the blockchain node at 1210. This continues until a configurable retry limit (maximum number of retries) is exceeded. In such case, the transaction's nonce is reserved in cache at 1220 to make it available to other transactions, and the transaction is written to an error transaction table in the database at 1230. The transaction is removed from an active transaction table in the database at 1240.

In response to a chronologically periodic software event generated by the ETM_Scheduling_Service 315, that service queries the error transaction table in the database at 1250. For and from each errored transaction found, the raw transaction is extracted and enqueued in a raw transaction queue at 1260. The ETM_TxHandler_Service 305 will then process the raw transaction at 1270 along the normal path described above with respect to FIG. 10.

Transaction Failed Path

If the polling process indicates that a transaction was mined, but that transaction execution failed, the transaction is dequeued from the polling queue like in the "mined and succeeded" path in FIG. 10, but the transaction's status is written as "Tx-Failed".

Summary of Activity Timings

Figure 13:
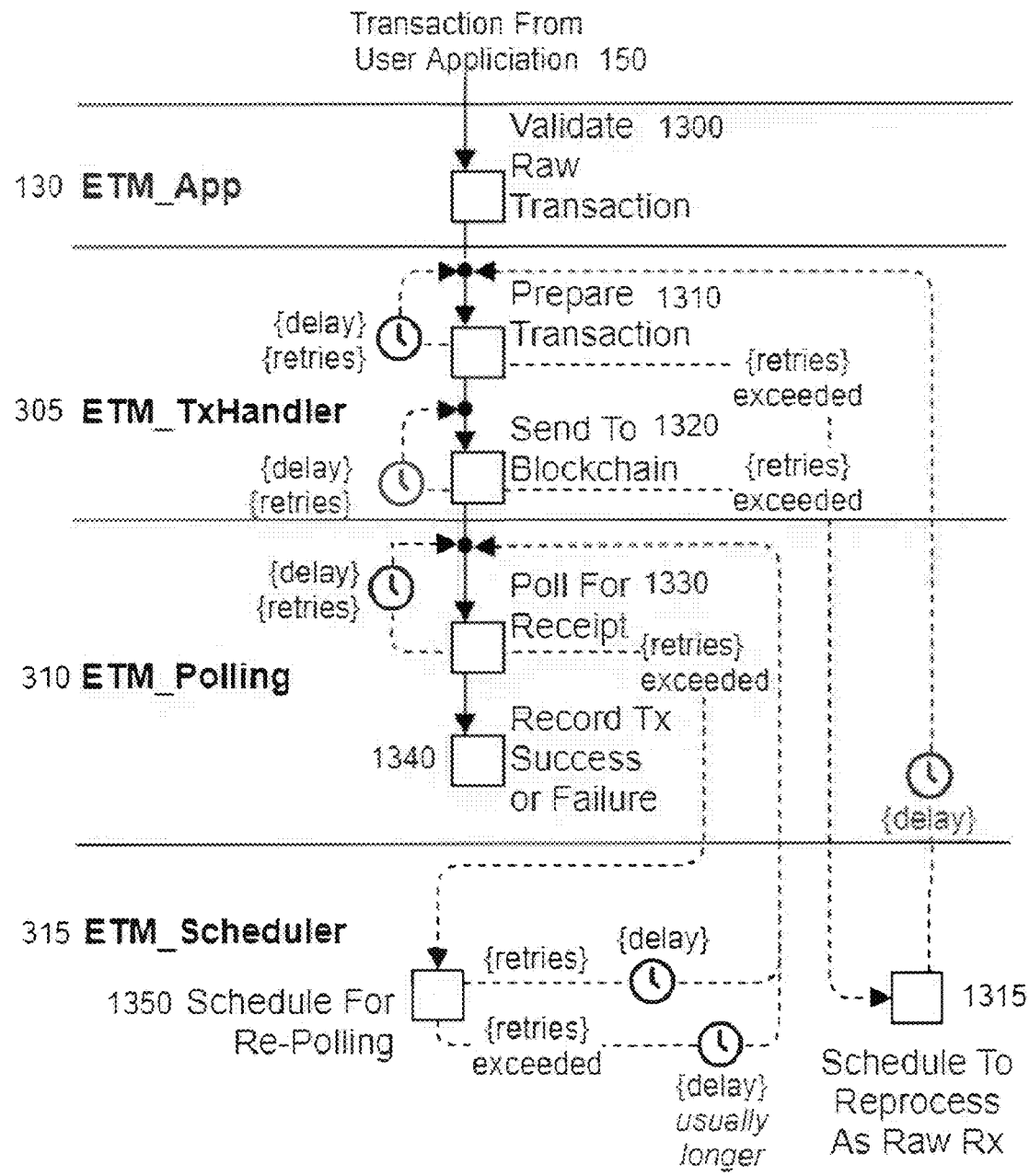
FIG. 13 provides a high-level summary of the activity paths described above, with a focus on the points where the system retries processes after error situations and/or intentionally introduces time delays.

FIG. 13 provides a high-level summary of the activity paths described above, with a focus on the points where the system intentionally introduces time delays. As illustrated, a transaction received from a user application 150 is provided to the ETM application 130 and the raw transaction is validated at 1300. The validated raw transaction is provided to the ETM_TxHandler_Service 305, which prepares the transaction at 1310. The REST API 300 provides a time delay and retry count for these operations. The delay is intentionally introduced into processing by the ETM_Tx-Handler_Service 305 before each retry to prepare the transaction, to allow problem-inducing conditions to self-resolve. If the transaction is not successfully prepared after the provided retry count is exceeded, the transaction is sent to the ETM_Scheduling_Service 315 at 1315 to schedule reprocessing of the transaction as a raw transaction after a specified period of time. Once the transaction is successfully prepared at 1310, the transaction is sent to the blockchain at 1320. The ETM_TxHandler_Service 305 provides a retry_count and intentional delay time period per retry for this operation as well. If the transaction is not successfully prepared and the retry_count is exceeded, the transaction is similarly sent to the ETM_Scheduling_Service 315 at 1315 to schedule reprocessing of the transaction as a raw transaction after a specified period of time. Once the transaction has been sent to the blockchain at 1320, the ETM_Polling_Service 310 polls for a receipt at 1330 and records a transaction success or failure at 1340. A limit on the polling period is also provided (e.g., 5000 ms or a specified maximum number of retries). If the polling exceeds the maximum number of retries, the ETM_Scheduling_Service 315 schedules the re-polling at 1350. For example, as illustrated, the re-polling may be tried several times in the first few minutes and then retried at longer intervals thereafter. If polling again yields no receipt, this flow is repeated, with longer delays after a configurable number of iterations. This repetition for an unmined transaction will continue indefinitely until receipt is received. Thus, under certain circumstances, the transaction is held and retried after a period of time until successfully processed.

Additional Information About Queues in ETM

Although the role of queues in the transaction lifecycle has been explained, it may be helpful to understand the contents of the queues and their usage in greater detail than was provided with respect to FIG. 2.

The content of every queue is transactions, in some form. The schema describing the objects published to them depends on whether the transaction is raw, prepared, or in an error state, and whether it is a simple or a smart contract transaction. Table 6 enumerates the publishing and consuming relationships in which one of these objects is queued or dequeued. In describing what each queue holds, the Table 6 uses a shorthand that combines the type and lifecycle progress of the transaction.

TABLE 6

| Service Component | Queue Name | What The Service: Consumes From This Queue | What The Service: Publishes To This Queue |
| --- | --- | --- | --- |
| ETM_App | etm_app_transaction | | raw_tx |
| | etm_app_contract | | raw_tx |
| ETM_TxHandler | etm_app_transaction | raw_tx | |
| | etm_app_contract | raw_tx | |
| | etm_tx_persistence | prepared_tx | prepared_tx |
| | etm_cont_persistence | prepared_contract | prepared_contract |
| | etm_app_transaction_retry | errored_tx | errored_tx |
| | etm_app_contract_retry | errored_contract | errored_contract |
| | etm_error | unresolved_errored | unresolved_errored |
| | etm_tx_polling | | submitted_tx |
| | etm_cont_polling | | submitted_contract |
| ETM_Polling | etm_tx_polling | submitted_tx | |
| | etm_cont_polling | submitted_contract | |
| | etm_tx_polling_retry | | submitted_tx |
| | etm_cont_polling_retry | | submitted_contract |
| | etm_polling_fin_retry | no_receipt_tx, no_receipt_contract | |
| ETM_Scheduling | etm_polling_fin_retry | no_receipt_tx, no_receipt_contract | |

Table 7 further details the shorthand terms for transaction type and life cycle progress that were used in Table 6. The data entity used to represent the transaction of each type and state is included.

TABLE 7

| Transaction Type/State | Description | Status in Database |
| --- | --- | --- |
| raw_tx | A transaction as it was received from the user. It may be a simple transaction or one that contains a new smart contract to be deployed. (Entity: Transaction) | Tx-Received |
| prepared_tx | A simple transaction's raw_tx with nonce, gas price, and gas limit added. (Entity: Transaction) | Tx-Received |
| prepared_contract | A contract transaction raw_tx, with nonce, gas price, and gas limit added. (Entity: Contract) | Tx-Received |
| errored_tx | A prepared_tx which was rejected when sent to the proximate blockchain node 110. (Entity: Error) | Tx-Received (while re-sending) |
| errored_contract | A prepared_contract which was rejected when sent to the proximate blockchain node 110. (Entity: Error) | Tx-Received (while re-sending) |
| unresolved_errored | An errored_tx or errored_contract which was re-sent to the proximate blockchain node 110 and repeatedly rejected. (Entity: Error) | Tx-Error |
| submitted_tx | A prepared_tx which was signed and sent to the proximate blockchain node 110 and was not rejected. (Entity: Transaction) | Tx-Submitted (initially) Tx-Pending (once polling starts) |
| submitted_contract | A prepared_contract which was signed and sent to the proximate blockchain node 110 and was not rejected. (Entity: Contract) | Tx-Submitted (initially) Tx-Pending (once polling starts) |
| no_receipt_tx | A submitted_tx which has not appeared in a mined block, after a predetermined period of polling the proximate blockchain node 110. (Entity: Transaction) | Tx-Pending |
| no_receipt_contract | A submitted_contract which has not appeared in a mined block, after a predetermined period of polling the proximate blockchain node 110. (Entity: Contract) | Tx-Pending |
| failed_tx | Polling or scheduler received receipt that the simple transaction was mined but failed. (Entity: Transaction) | Tx_Failed |
| failed_contract | Polling or scheduler received receipt that the contract transaction was mined but failed. (Entity: Contract) | Tx_Failed |
| succeeded_tx | Polling or scheduler received receipt that the simple transaction was mined and executed successfully. (Entity: Transaction) | Tx_Success |
| succeeded_contract | Polling or scheduler received receipt that the contract transaction was mined and executed successfully. | Tx_Success |

The shorthand state names outlined in Table 7 may be used to illustrate, in a state transition model, a transaction-oriented view of the processes described above.

Figure 14:
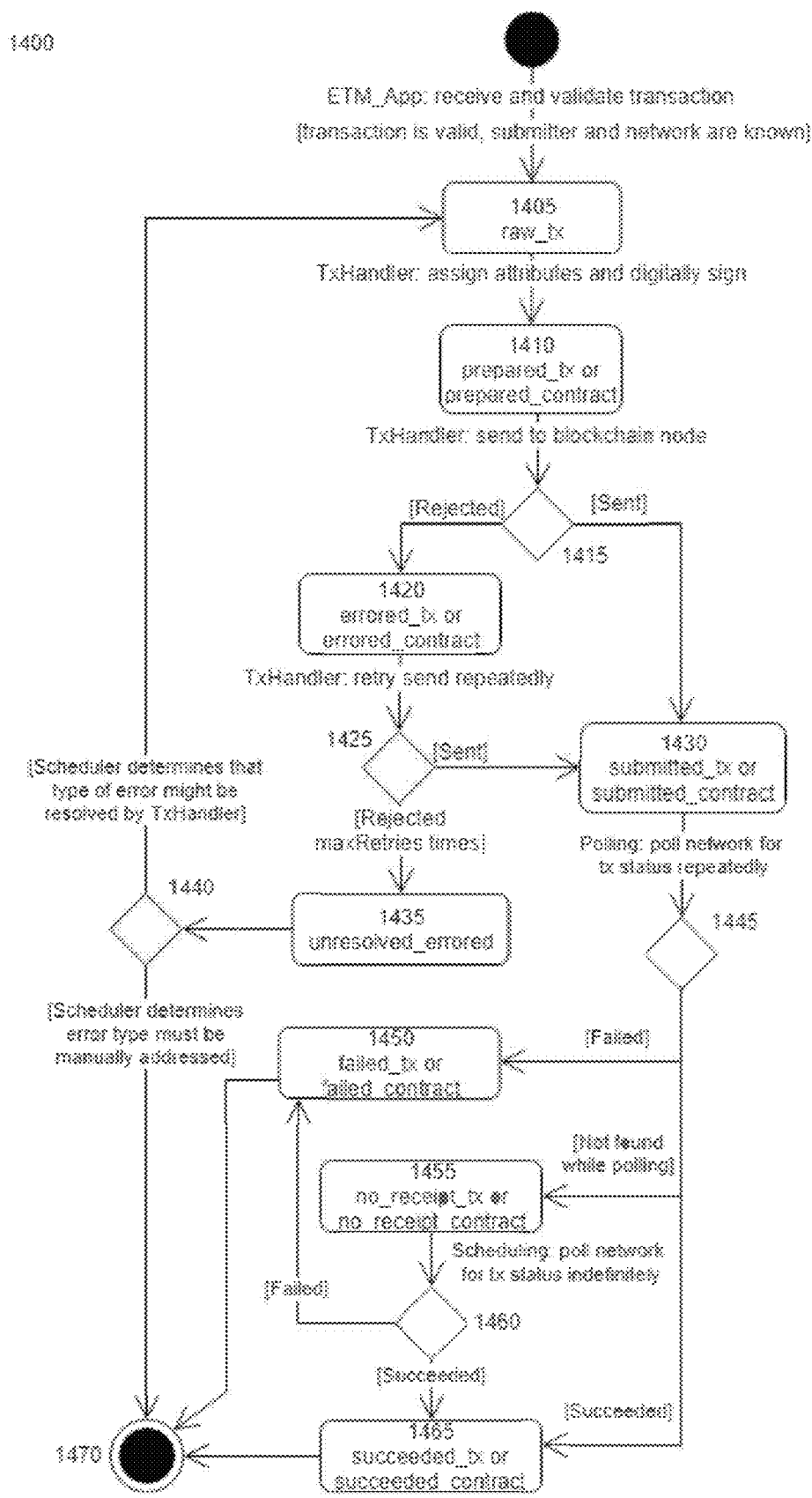
FIG. 14 illustrates the blockchain transaction management processes visualized as a state transition model in a sample embodiment.

FIG. 14 illustrates the lifecycle of a transaction in the blockchain transaction management process visualized as a Unified Modeling Language (UML) state transition model 1400 for a single blockchain transaction submitted to a sample embodiment. As illustrated, the ETM_App component 130 receives and validates a transaction (i.e., the transaction is valid and the submitter and blockchain network are known), at which point the transaction can be considered to be in its initial state in the system, labeled raw_tx 1405. The raw transaction in state 1405 is provided to the transaction handler (ETM_TxHandler_Service 305) to assign attributes and to digitally sign the transaction. If successful, the transaction can be considered to have entered a prepared transaction or prepared contract state 1410, the distinction dependent on whether the transaction is a simple or contract transaction, respectively. This definition applies to subsequent states where such a distinction is mentioned in the illustration. When the transaction handler sends a transaction in this state to its proximate blockchain node 110, it can be considered to enter one of two states, depending on whether the transaction was successfully sent or whether it was rejected by the proximate blockchain node 110 as represented by a decision pseudostate at 1415. If rejected, the transaction enters an errored transaction or errored contract transaction state 1420. If sent, the transaction enters a submitted transaction or submitted contract transaction state 1430. Continuing from 1420, the transaction handler then retries the send, potentially repeatedly, with the result determining a new state, per pseudostate 1425. If any retry succeeds, the transaction enters the submitted transaction or submitted contract state 1430. However, if the transaction is rejected a number of times that exceeds the configurable MaxRetries threshold, the transaction can be considered to enter an unresolved_errored state 1435. For a transaction in the unresolved_errored state, the scheduler (ETM_Scheduling_Service 315) determines whether the error is a type of error that may be resolved by the transaction handler. This determination is represented by decision pseudostate 1440. If so, the transaction is returned to the raw transaction state 1405 and the lifecycle continued from that state. On the other hand, if the scheduler 315 determines at decision pseudostate 1440 that the error type is to be manually addressed, the transaction remains in the unresolved_errored state 1435 permanently, as represented by the transition to the end state pseudostate 1470.

Once the transaction has entered the submitted transaction or submitted contract state 1430, the blockchain network is repeatedly polled by component ETM_Polling_Service 310 for the status of that transaction. The outcome of that process determines the next transition, as represented by decision pseudostate 1445. If the polling indicates the transaction was mined and Failed, the transaction enters the failed transaction or failed contract state 1450 which is its final state as represented by the transition to end pseudostate 1470.

On the other hand, if the transaction is not found during polling at the polling state 1445, the transaction enters the no_receipt_transaction or no_receipt_contract state 1455. It remains in this state while component ETM_Schduling_Service 315 and ETM_Polling_Service 310 collaborate to poll the blockchain network for the status of the transaction. The polling may continue indefinitely, but if a result is obtained, the transaction's subsequent state is determined by that result, as represented by decision pseudostate 1460. If the polling indicates that the transaction was mined and Failed, the transaction enters the failed transaction or failed contract state 1450 which as previously mentioned is its final state, as represented by the transition to end pseudostate 1470.

Finally, if the polling considered at either decision pseudostate 1445 or decision pseudostate 1460 indicated the transaction was mined and Succeeded, the transaction enters a succeeded transaction or succeeded contract state 1465, which is its final state, as represented by the transition to end pseudostate 1470.

Thus, the blockchain transaction manager 100 described herein operates to successfully guide blockchain transactions from a user's computer to a blockchain.

Computer Embodiment

Figure 15:
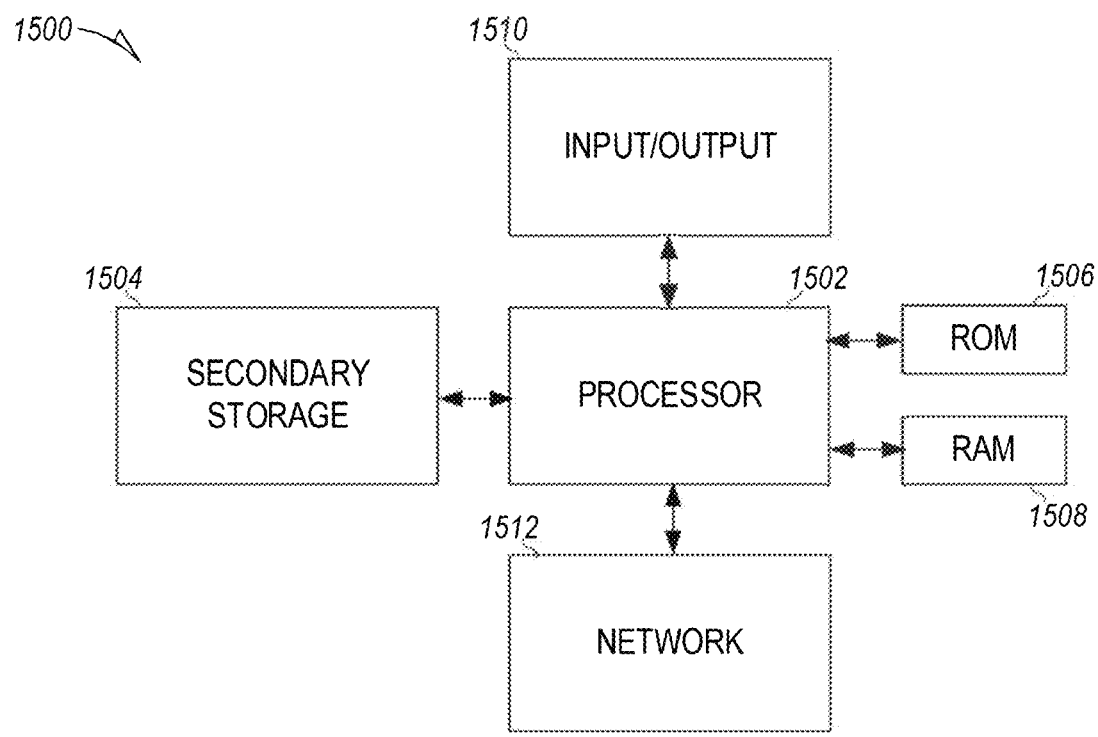
FIG. 15 is a block diagram of a typical, general-purpose computer that may be programmed into a special purpose computer suitable for implementing one or more embodiments of the blockchain transaction manager disclosed herein.

FIG. 15 is a block diagram of a typical, general-purpose computer 1500 that may be programmed into a special purpose computer suitable for implementing one or more embodiments of the blockchain transaction manager 100 disclosed herein. The blockchain transaction manager 100 described above may be implemented on any general-purpose processing component, such as a computer with sufficient processing power, memory resources, and communications throughput capability to handle the necessary workload placed upon it. The computer 1500 includes a processor 1502 (which may be referred to as a central processor unit or CPU) that is in communication with memory devices including secondary storage 1504, read only memory (ROM) 1506, random access memory (RAM) 1508, input/output (I/O) devices 1510, and network connectivity devices 1512. The processor 1502 may be implemented as one or more CPU chips or may be part of one or more application specific integrated circuits (ASICs).

The secondary storage 1504 is typically comprised of one or more disk drives or tape drives and is used for non-volatile storage of data and as an over-flow data storage device if RAM 1508 is not large enough to hold all working data. Secondary storage 1504 may be used to store programs that are loaded into RAM 1508 when such programs are selected for execution. The ROM 1506 is used to store instructions and perhaps data that are read during program execution. ROM 1506 is a non-volatile memory device that typically has a small memory capacity relative to the larger memory capacity of secondary storage 1504. The RAM 1508 is used to store volatile data and perhaps to store instructions. Access to both ROM 1506 and RAM 1508 is typically faster than to secondary storage 1504.

The devices described herein may be configured to include computer-readable non-transitory media storing computer readable instructions and one or more processors coupled to the memory, and when executing the computer readable instructions configure the computer 1500 to perform method steps and operations described above with reference to FIG. 1 to FIG. 14. The computer-readable non-transitory media includes all types of computer readable media, including magnetic storage media, optical storage media, flash media and solid-state storage media.

It should be further understood that software including one or more computer-executable instructions that facilitate processing and operations as described above with reference to any one or all of steps of the disclosure may be installed in and sold with one or more servers and/or one or more routers and/or one or more devices within consumer and/or producer domains consistent with the disclosure. Alternatively, the software may be obtained and loaded into one or more servers and/or one or more routers and/or one or more devices within consumer and/or producer domains consistent with the disclosure, including obtaining the software through physical medium or distribution system, including, for example, from a server owned by the software creator or from a server not owned but used by the software creator. The software may be stored on a server for distribution over the Internet, for example.

Also, it will be understood by one skilled in the art that this disclosure is not limited in its application to the details of construction and the arrangement of components set forth in the description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments may be implemented, at least in part, in digital electronic circuitry, analog electronic circuitry, or in computer hardware, firmware, software, or in combinations of them. These components may be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. Also, functional programs, codes, and code segments for accomplishing the techniques described herein may be easily construed as within the scope of the present disclosure by programmers skilled in the art. Method steps associated with the illustrative embodiments may be performed by one or more programmable processors executing a computer program, code or instructions to perform functions (e.g., by operating on input data and/or generating an output). Method steps may also be performed by, and apparatus may be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory may be supplemented by or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure. A software module may reside in random access memory (RAM), flash memory, ROM, EPROM, EEPROM, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. In other words, the processor and the storage medium may reside in an integrated circuit or be implemented as discrete components.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, that is capable of storing instructions for execution by one or more processors, such that the instructions, when executed by one or more processors cause the one or more processors to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

The above-presented description and figures are intended by way of example only and are not intended to limit the illustrative embodiments in any way except as set forth in the appended claims. It is noted that various technical aspects of the various elements of the various exemplary embodiments that have been described above may be combined in numerous other ways, all of which are considered to be within the scope of the disclosure.

Accordingly, although exemplary embodiments have been disclosed for illustrative purposes, those skilled in the art will appreciate that various modifications, additions, and substitutions are possible. Therefore, the disclosure is not limited to the above-described embodiments but may be modified within the scope of appended claims, along with their full scope of equivalents.

What is claimed is:

1. A blockchain transaction manager that receives blockchain transactions intended for a node in a blockchain network and manages submission of the blockchain transactions to the node in the blockchain network, comprising:

a transaction management application that prepares a blockchain transaction for submission to the blockchain network by assigning a nonce to the blockchain transaction, estimating cost attributes for the blockchain transaction, and assigning cost attributes to the blockchain transaction based on the estimated cost attributes, the transaction management application further queueing the blockchain transaction for submission to the blockchain network when the node in the blockchain network is ready to accept the blockchain transaction;
a transaction handler that digitally signs or certifies the blockchain transaction for submission to the blockchain network as applicable to the blockchain network using identity credentials supplied by a user application, submits the digitally signed or certified blockchain transaction to the node in the blockchain network, and enqueues the digitally signed or certified blockchain transaction for status tracking; and
a blockchain poller that polls a status of the blockchain transaction submitted to the blockchain network.

2. The blockchain transaction manager of claim 1, further comprising a management activities scheduler that receives blockchain transactions that have been rejected by the node in the blockchain network and resends the rejected blockchain transactions for submission to the node in the blockchain network.

3. The blockchain transaction manager of claim 2, wherein, when initial polling of submitted blockchain transaction by the blockchain poller has exceeded a configurable maximum number of attempts, the management activities scheduler schedules further polling of the blockchain status at a reduced rate by the blockchain poller to continue to track status of the submitted blockchain transaction.

4. The blockchain transaction manager of claim 1, further comprising a transaction management console that provides access to the transaction management application by a human user via an interactive interface, the transaction management console providing a list of blockchain transactions and their status to the user via the user's interactive interface.

5. The blockchain transaction manager of claim 4, wherein the transaction management console further manages identity or transaction certification credentials for use with blockchain transactions.

6. The blockchain transaction manager of claim 1, further comprising a database that stores a submitted blockchain transaction that has not been successfully written to the node in the blockchain network and that stores a reason that the submission was not successful and a status of the submitted blockchain transaction.

7. The blockchain transaction manager of claim 1, wherein the transaction management application assigns a universal unique identifier to the blockchain transaction for tracking purposes upon receipt.

8. The blockchain transaction manager of claim 1, wherein the transaction management application automatically assigns the nonce to the blockchain transaction when the blockchain network includes a blockchain transaction nonce mechanism.

9. The blockchain transaction manager of claim 8, wherein the transaction management application automatically assigns the nonce to the blockchain transaction by performing operations including:
when multiple blockchain transactions for a same account and blockchain network are being processed concurrently, using a locking mechanism to ensure that a nonce is calculated for only one blockchain transaction at a time;
when a blockchain transaction is not accepted by the node in the blockchain network after multiple retries, assigning a nonce of the unaccepted blockchain transaction to a pool of nonces available for reuse by an account associated with the unaccepted blockchain transaction;
when assigning a nonce, considering whether the pool of available nonces contains any nonces for the account associated with the blockchain transaction; and
when the pool of nonces contains at least one nonce for the account associated with the blockchain transaction, selecting a lowest-valued nonce and assign the lowest-valued nonce to the blockchain transaction.

10. The blockchain transaction manager of claim 9, wherein the transaction management application assigns the nonce to the received blockchain transaction by performing further operations including:
obtaining a nonce from the node in the blockchain network for the account ($N_{web3}$) associated with the blockchain transaction;
obtaining a nonce last automatically assigned for the account ($N_{red}$) associated with the blockchain transaction;
subtracting the nonce from the node in the blockchain network for the account ($N_{web3}$) associated with the blockchain transaction from the nonce last automatically assigned for the account ($N_{red}$) associated with the blockchain transaction; and
when $N_{red}-N_{web3}$ is greater than a predefined nonce window, then picking the nonce from the node in the blockchain network for the account ($N_{web3}$) associated with the blockchain transaction; otherwise select a nonce having a greater value.

11. The blockchain transaction manager of claim 1, wherein the transaction management application estimates cost attributes for the blockchain transaction by calculating a maximum amount of computation and storage proxy units (G) a transaction sender indicates they are willing to compensate for processing the blockchain transaction by the blockchain network containing the node by performing operations including:
obtaining a limit of previously mined blocks from the blockchain network ($G_{mb}$), wherein the limit includes a maximum of a sum of a maximum amount of proxy computation and storage units a transaction sender indicates they are willing to compensate for processing selected blockchain transactions that are to be mined into a single block by the blockchain network containing the node;
obtaining an estimate of an actual amount of proxy computation and storage units required to process the transaction ($G_{db}$);
when $G_{db} >= G_{mb}$ then assigning $G=G_{mb}*\alpha$, where $\alpha<1$;
when $G_{mb} > G_{db}$ then calculating a ratio $R=G_{mb}/G_{db}$ and finding G as follows:
when (R>=0 and R<=a configurable ratio $CR_1$, where $CR_1>0$,) then $G=G_{db}*\beta$;
when (R>$CR_1$ and R<=a configurable ratio $CR_2$, where $CR_2>CR_1$,) then $G=G_{db}*\gamma$;
when (R>$CR_2$) then $G=G_{db}*\delta$, where $\delta>\gamma>\beta>1$; and
adding G to the blockchain transaction before digitally signing or certifying the blockchain transaction and attempting to submit the digitally signed or certified blockchain transaction to the node in the blockchain network.

12. A method of managing submission of blockchain transactions to a node in a blockchain network, comprising:
assigning a nonce to a received blockchain transaction;
estimating cost attributes for the received blockchain transaction;

assigning cost attributes to the received blockchain transaction based on the estimated cost attributes;

queueing the received blockchain transaction for submission to the blockchain network when the node in the blockchain network is ready to accept the received blockchain transaction;

digitally signing or certifying the received blockchain transaction for submission to the blockchain network as applicable to the blockchain network using identity credentials supplied by a user application;

submitting the digitally signed or certified blockchain transaction to the node in the blockchain network;

enqueuing the digitally signed or certified blockchain transaction for status tracking; and polling a status of the blockchain transaction submitted to the blockchain network.

13. The method of claim 12, wherein polling the status of the blockchain transaction comprises polling the node in the blockchain network for information regarding progress of a submitted blockchain transaction toward acceptance in the blockchain network and retrying the polling until desired progress information is received.

14. The method of claim 13, further comprising decreasing a frequency of the polling after expiration of a time period or a maximum number of polling attempts.

15. The method of claim 12, further comprising receiving a response indicating whether the submission of the blockchain transaction to the node in the blockchain network resulted in the blockchain transaction being accepted by the blockchain network according to a criteria appropriate to the blockchain network.

16. The method of claim 15, further comprising writing the submitted blockchain transaction to a database with a status of the submitted blockchain transaction.

17. The method of claim 16, wherein when the status of the submitted blockchain transaction indicates that the submission was not successful, further storing in the database a reason why the submission was not successful.

18. The method of claim 17, wherein when the submitted blockchain transaction has been rejected by the node in the blockchain network, applying a repair algorithm to at least one transaction attribute of the rejected blockchain transaction to create a repaired blockchain transaction, digitally signing or certifying the repaired blockchain transaction, and attempting to submit the repaired blockchain transaction to the node in the blockchain network.

19. The method of claim 17, wherein when the submitted blockchain transaction has been rejected by the node in the blockchain network due to a retriable error, resubmitting the submitted blockchain transaction to the node in the blockchain network until accepted or a retry limit is exceeded.

20. The method of claim 19, wherein when the retry limit is exceeded, performing at least one of: indicating availability of the blockchain transaction's nonce by adding a nonce value to a stored pool of available transaction nonces, writing the submitted blockchain transaction to an error transaction table in a database, or extracting an originally submitted blockchain transaction and causing the originally submitted blockchain transaction to again be prepared and sent using the same processes as newly received blockchain transactions.

21. The method of claim 12, further comprising automatically assigning the nonce to the received blockchain transaction when the blockchain network includes a transaction nonce mechanism.

22. The method of claim 21, wherein automatically assigning the nonce to the received blockchain transaction comprises:

when multiple blockchain transactions for a same account and blockchain network are being processed concurrently, using a locking mechanism to ensure that a nonce is calculated for only one blockchain transaction at a time;

when a blockchain transaction is not accepted by the node in the blockchain network after multiple retries, assigning a nonce of the unaccepted blockchain transaction to a pool of nonces available for reuse by an account associated with the unaccepted blockchain transaction;

when assigning a nonce, considering whether the pool of available nonces contains any nonces for the account associated with the received blockchain transaction; and when the pool of nonces contains at least one nonce for the account associated with the received blockchain transaction, selecting a lowest-valued nonce and assign the lowest-valued nonce to the received blockchain transaction.

23. The method of claim 22, wherein automatically assigning the nonce to the received blockchain transaction further comprises:

obtaining a nonce from the node in the blockchain network for the account ($N_{web3}$) associated with the blockchain transaction;

obtaining a nonce last automatically assigned for the account (N) associated with the blockchain transaction;

subtracting the nonce from the node in the blockchain network for the account ($N_{web3}$) associated with the blockchain transaction from the nonce last automatically assigned for the account ($N_{red}$) associated with the blockchain transaction; and when $N_{red}-N_{web3}$ is greater than a predefined nonce window, then picking the nonce from the node in the blockchain network for the account ($N_{web3}$) associated with the blockchain transaction; otherwise select a nonce having a greater value.

24. The method of claim 23, further comprising, prior to digitally signing or certifying the received blockchain transaction, selecting a lowest available nonce for the account associated with the blockchain transaction, and when the pool contains a nonce having a lower value than the selected nonce, exchanging the selected nonce with a lower-valued nonce from the pool and using the lower-valued nonce from the pool for the received blockchain transaction.

25. The method of claim 12, wherein when the submitted blockchain transaction is rejected by the node in the blockchain network, writing a nonce of the rejected blockchain transaction to a pool of nonces and using a lowest numbered nonce in the pool by a next received blockchain transaction prepared for submission to the node in the blockchain network.

26. The method of claim 25, automatically assigning the rejected blockchain transaction a new nonce before again digitally signing or certifying the rejected blockchain transaction for resubmission to the node in the blockchain network.

27. The method of claim 12, wherein the cost attributes include an amount a submitter of the blockchain transaction is offering to pay in blockchain transaction fees per proxy unit of computation and storage costs that will be incurred by a blockchain network containing the node for processing of the blockchain transaction, further comprising calculating the amount based on an amount associated with blockchain transactions recently accepted in the blockchain network.

28. The method of claim 12, wherein estimating cost attributes for the blockchain transaction comprises automatically calculating a maximum amount of computation and storage proxy units (G) a transaction sender indicates they are willing to compensate for processing the blockchain transaction by the blockchain network containing the node by:
   obtaining a limit of previously mined blocks from the blockchain network ($G_{mb}$), wherein the limit includes a maximum of a sum of a maximum amount of proxy computation and storage units a transaction sender indicates they are willing to compensate for processing selected blockchain transactions that are to be mined into a single block by the blockchain network containing the node;
   obtaining an estimate of an actual amount of proxy computation and storage units required to process the transaction ($G_{db}$);
   when $G_{db} >= G_{mb}$, then assigning $G=G_{mb}*\alpha$, where $\alpha<1$;
   when $G_{mb} > G_{db}$ then calculating a ratio $R=G_{mb}/G_{db}$ and finding G as follows:
   when ($R>=0$ and $R<=$ a configurable ratio $CR_1$, where $CR_1>0$,) then $G=G_{db}*\beta$;
   when ($R>CR_1$ and $R<=$ a configurable ratio $CR_2$, where $CR_2>CR_1$,) then $G=G_{db}*\gamma$;
   when ($R>CR_2$) then $G=G_{db}*\delta$, where $\delta>\gamma>\beta>1$; and
   adding G to the blockchain transaction before digitally signing or certifying the blockchain transaction and attempting to submit the digitally signed or certified blockchain transaction to the node in the blockchain network.

29. The method of claim 12, wherein when the submitted blockchain transaction is rejected by the node in the blockchain network due to an amount a submitter of the blockchain transaction is offering to pay in blockchain transaction fees per proxy unit of estimated computation and storage costs that will be incurred by the blockchain network containing the node for processing of the blockchain transaction being too low or too high, adjusting up or down by a predetermined percentage a maximum amount of computation and storage proxy units a transaction sender indicates they are willing to compensate for processing the blockchain transaction by the blockchain network containing the node and resending the blockchain transaction to the node in the blockchain network after a scheduled delay.

30. A non-transitory computer-readable medium that stores instructions that when executed by one or more processors cause the one or more processors to implement a method of managing submission of blockchain transactions to a node in a blockchain network, comprising:
   assigning a nonce to a received blockchain transaction;
   estimating cost attributes for the received blockchain transaction;
   assigning cost attributes to the received blockchain transaction based on the estimated cost attributes;
   queueing the received blockchain transaction for submission to the blockchain network when the node in the blockchain network is ready to accept the received blockchain transaction;
   digitally signing or certifying the received blockchain transaction for submission to the blockchain network as applicable to the blockchain network using identity credentials supplied by a user application;
   submitting the digitally signed or certified blockchain transaction to the node in the blockchain network;
   enqueuing the digitally signed or certified blockchain transaction for status tracking; and
   polling a status of the blockchain transaction submitted to the blockchain network.

31. The medium of claim 30, further comprising instructions that when executed by the one or more processors cause the one or more processors to assign a universal unique identifier to the blockchain transaction for tracking purposes upon receipt.

32. The medium of claim 30, further comprising instructions that when executed by the one or more processors cause the one or more processors to resubmit the blockchain transaction when the blockchain transaction has been rejected by the node in the blockchain network and to determine when initial polling of the submitted blockchain transaction has timed out and then scheduling further polling of the blockchain status at a reduced rate to continue to track status of the submitted blockchain transaction after initial polling of the submitted blockchain transaction has timed out.

* * * * *